United States Patent
Zhou

(10) Patent No.: US 7,840,988 B1
(45) Date of Patent: Nov. 23, 2010

(54) FRONT-END STRUCTURE FOR ACCESS NETWORK LINE CARD

(75) Inventor: Jiahuai Zhou, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 1408 days.

(21) Appl. No.: 10/840,884

(22) Filed: May 7, 2004

(51) Int. Cl.
H04N 7/173 (2006.01)

(52) U.S. Cl. .............................. 725/114; 714/4; 714/11; 714/13

(58) Field of Classification Search .................. 725/95, 725/105–128, 148, 149; 348/192; 370/217, 370/221, 219; 714/4
See application file for complete search history.

(56) References Cited

U.S. PATENT DOCUMENTS

| | | | |
|---|---|---|---|
| 4,692,918 A | | 9/1987 | Elliott et al. |
| 5,016,244 A | | 5/1991 | Massey, Jr. et al. |
| 5,018,133 A | | 5/1991 | Tsukakoshi et al. |
| 5,218,600 A | | 6/1993 | Schenkyr et al. |
| 5,313,456 A | * | 5/1994 | Sugawara .................... 370/228 |
| 5,371,852 A | | 12/1994 | Attanasio et al. |
| 5,414,704 A | | 5/1995 | Spinney |
| 5,473,599 A | | 12/1995 | Li et al. |
| 5,488,412 A | | 1/1996 | Majeti et al. |
| 5,506,987 A | | 4/1996 | Abramson et al. |
| 5,572,528 A | | 11/1996 | Shuen |
| 5,586,121 A | | 12/1996 | Moura et al. |

(Continued)

FOREIGN PATENT DOCUMENTS

WO WO98/31107 7/1998

(Continued)

OTHER PUBLICATIONS

Broadband Service Router 6400, Cable Modem Termination System and Router, printed from www.motorola.com/broadband on Apr. 26, 2004, 8 pages.

(Continued)

Primary Examiner—Andrew Y Koenig
Assistant Examiner—Alfonso Castro
(74) Attorney, Agent, or Firm—Weaver Austin Villeneuve & Sampson LLP

(57) ABSTRACT

A technique is described for facilitating communication in access networks such as cable networks. One aspect of the present invention is directed to an improved line card configuration which may be used to provide upstream channel "high availability" protection whereby the cable modems of a failed upstream channel may be immediately and dynamically reassigned to an alternate upstream channel in order to minimize service disruption. Another aspect of the present invention is directed to an improved line card configuration which is able to provide load balancing capabilities across multiple upstream channels associated with one or more line cards. According to a specific implementation, such load balancing capabilities may be used to reassign cable modems (which are physically connected to a fixed upstream port) to alternate upstream channels. Yet another aspect of the present invention is directed to an improved line card configuration which is able to provide the feature of virtual cabling. According to one embodiment, the feature of virtual cabling may be used to dynamically configure, via software, cable modems from any selected subscriber group to "talk" to any desired PHY chip on any line card within a CMTS.

31 Claims, 12 Drawing Sheets

U.S. PATENT DOCUMENTS

| | | | |
|---|---|---|---|
| 5,619,552 | A | 4/1997 | Karppanen et al. |
| 5,729,537 | A | 3/1998 | Billstrom |
| 5,793,763 | A | 8/1998 | Mayes et al. |
| 5,818,845 | A | 10/1998 | Moura et al. |
| 5,825,759 | A | 10/1998 | Liu |
| 5,828,655 | A | 10/1998 | Moura et al. |
| 5,859,852 | A | 1/1999 | Moura et al. |
| 5,862,345 | A | 1/1999 | Okanoue et al. |
| 5,862,451 | A | 1/1999 | Grau et al. |
| 5,872,773 | A | 2/1999 | Katzela et al. |
| 5,892,903 | A | 4/1999 | Klaus |
| 5,943,604 | A | 8/1999 | Chen et al. |
| 5,946,047 | A | 8/1999 | Levan |
| 5,946,048 | A | 8/1999 | Levan |
| 5,950,205 | A | 9/1999 | Aviani, Jr. |
| 5,953,335 | A | 9/1999 | Erimli et al. |
| 5,956,346 | A | 9/1999 | Levan |
| 5,959,660 | A | 9/1999 | Levan |
| 5,959,968 | A | 9/1999 | Chin et al. |
| 5,959,997 | A | 9/1999 | Moura et al. |
| 5,989,060 | A | 11/1999 | Coile et al. |
| 6,006,266 | A | 12/1999 | Murphy, Jr. et al. |
| 6,016,388 | A | 1/2000 | Dillon |
| 6,052,718 | A | 4/2000 | Gifford |
| 6,078,575 | A | 6/2000 | Dommety et al. |
| 6,195,705 | B1 | 2/2001 | Leung |
| 6,236,678 | B1 | 5/2001 | Horton et al. |
| 6,256,293 | B1 * | 7/2001 | Gerstel et al. ............... 370/228 |
| 6,260,070 | B1 | 7/2001 | Shah |
| 6,292,832 | B1 | 9/2001 | Shah et al. |
| 6,298,381 | B1 | 10/2001 | Shah et al. |
| 6,345,294 | B1 | 2/2002 | O'Toole et al. |
| 6,345,310 | B1 * | 2/2002 | Allison et al. ............... 709/250 |
| 6,446,121 | B1 | 9/2002 | Shah et al. |
| 6,449,250 | B1 | 9/2002 | Otani et al. |
| 6,505,254 | B1 | 1/2003 | Johnson et al. |
| 6,957,369 | B2 * | 10/2005 | Bruckman et al. ........... 714/716 |
| 7,170,854 | B1 * | 1/2007 | Orrell et al. ................. 370/228 |
| 2002/0057018 | A1 * | 5/2002 | Branscomb et al. ........... 307/42 |
| 2003/0035430 | A1 * | 2/2003 | Islam et al. ................. 370/401 |
| 2003/0179707 | A1 * | 9/2003 | Bare ........................ 370/235 |
| 2003/0200330 | A1 * | 10/2003 | Oelke et al. ................. 709/238 |
| 2003/0208618 | A1 * | 11/2003 | Mor et al. ................... 709/238 |
| 2007/0050835 | A1 * | 3/2007 | Liva et al. ................... 725/129 |

FOREIGN PATENT DOCUMENTS

WO      WO 0213465 A1 * 2/2002

OTHER PUBLICATIONS

Docsis 2.0 and Advanced S-CDMA: Maximizing the Data Return Path White Paper, printed from www.terayon.com on Apr. 26, 2004, 18 pages.

C4™ Cable Modem Termination System, printed from www.arrisi.com on Apr. 26, 2004, 4 pages.

DOCSIS/EuroDOCSIS 2.0 Advanced Cable Modem Termination System, BCM93214 Product Brief, printed from www.broadcom.com on Apr. 26, 2004.

Dual Universal Advanced TDMA Phy-Layer Burst Receiver, BCM3138, Product Brief, printed from www.broadcom.com on Apr. 26, 2004.

* cited by examiner

FRONT-END STRUCTURE FOR ACCESS NETWORK LINE CARD

BACKGROUND OF THE INVENTION

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services.

FIG. 1 shows a block diagram of a conventional two-way hybrid fiber-coaxial (HFC) cable network 100. As shown in FIG. 1, the cable network 100 includes a Head End complex 102 typically configured to service about 40,000 homes. The Head End complex 102 may include a plurality of components and/or systems (not shown) such as, for example, a Head End, a super Head End, a hub, a primary hub, a second hub, etc. Additionally, as shown in FIG. 1, the Head End complex 102 typically includes a Cable Modem Termination System (CMTS). Primary functions of the CMTS include (1) receiving data inputs from external sources 100 and converting the data for transmission over the cable plant; (2) providing appropriate Media Access Control (MAC) level packet headers for data received by the cable system, and (3) modulating and demodulating the data to and from the cable network. Typically, the Head End complex 102 is configured to provide a communication interface between nodes (e.g. cable modems) in the cable network and external networks such as, for example, the Internet. The cable modems typically reside at the subscriber premises 110A-D.

The Head End Complex 102 is typically connected to one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the Head End Complex 102 and the plurality of cable modems residing at the plurality of subscriber groups 110.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 2.0 RF Interface Specification (document control number SP-RFIv2.0-I04-030730, Jul. 30, 2003). That document is incorporated herein by reference for all purposes.

Communication between the Head End Complex 102 and fiber node 106a is typically implemented using modulated optical signals which travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the Head End Complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems residing at subscriber premises 110A-D. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timestamp counter, which, according to conventional implementations is a 32-bit counter that increments by one every clock pulse.

Typically, digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End Complex of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

FIG. 2 shows an example of a portion of a conventional cable network 200. As illustrated in FIG. 2, the CMTS 210 may include a plurality of line cards 202A, 202B, 202C. Each line card may include a downstream port (not shown) for transmitting information from the CMTS to the cable modems, and a plurality of upstream ports (e.g., 206A) for transmitting information from the cable modems to the CMTS. As illustrated in FIG. 2, each upstream port (e.g., Port A1) is physically configured to communicate with a respective group of cable modems (e.g., Group A 260a), which typically are located within a common physical region or location. Thus, for example, the cable modems in Group A 260a are physically configured to communicate with the CMTS via upstream Port A1, cable modems in Group B 260b are physically configured to communicate with the CMTS via upstream Port A2, cable modems in Group C 260c are physically configured to communicate with the CMTS via upstream Port B1, etc.

In conventional CMTS configurations such as those illustrated, for example, in FIG. 2, the line cards within the CMTS are not interconnected in a manner which allows for cable modems from different groups to "talk" to different line cards. Additionally, according to conventional line card configurations, there is no interconnection between each of the different upstream ports on a particular line card. Thus, for example, as illustrated in FIG. 2, the cable modems within Group A 260a are physically configured to communicate with the CMTS 210 via upstream Port A1, cable modems within Group B 260b are physically configured to communicate with the CMTS 210 via upstream Port A2. Because of this configuration constraint, problems may occur during a failure of one or more components associated with a particular line card. For example, if there is a failure a component of the upstream channel associated with Port A1, the cable modems of Group A 260a will be unable to communicate with the CMTS. Typically, in order to remedy such a problem, the entire line card will have to be replaced, resulting in service disruptions for all cable modem groups associated with that line card.

Another problem with conventional line card configurations is that the lack of interconnection between upstream ports also limits the availability to perform load balancing between various upstream ports on a given line card. Thus, for example, when new subscribers are added to a region where all cable modems (CMs) are physically connected to a fixed upstream port, there is no way to improve upstream bandwidth efficiency unless the connections from CMs to the fixed US port are physically reconfigured.

Accordingly, it will be appreciated that there exists a continual need to improve access network and line card configurations in order to provide improved network capabilities and performance.

SUMMARY OF THE INVENTION

According to different embodiments of the present invention, a head end of an access network is described. The access network comprises a plurality of subscriber groups including a first subscriber group and a second subscriber group. The first subscriber group includes a first plurality of nodes which communicate with the head end via a first upstream channel, and the second subscriber group includes a second plurality of nodes which communicate with the head end via a second upstream channel. The head end comprises a first plurality of physical layer components associated with the first upstream channel, wherein the first plurality of physical layer components includes a first upstream port and a first PHY processor, and wherein the first plurality of nodes are physically connected to the first upstream port. The head end further comprises a second plurality of physical layer components associated with the second upstream channel, wherein the second plurality of physical layer components includes a second upstream port and a second PHY processor, and wherein the second plurality of nodes are physically connected to the second upstream port. According to a specific implementation, the first and second plurality of physical layer components are adapted to allow upstream signals from the first plurality of nodes to be processed by the second PHY processor.

An alternate embodiment of the present invention is directed to a system in an access network. The system comprises a head end and a plurality of subscriber groups including a first subscriber group and a second subscriber group. The first subscriber group includes a first plurality of nodes which communicate with the head end via a first upstream channel. The second subscriber group includes a second plurality of nodes which communicate with the head end via a second upstream channel. The head end comprises a first plurality of physical layer components associated with the first upstream channel, wherein the first plurality of physical layer components includes a first upstream port and a first PHY processor, and wherein the first plurality of nodes are physically connected to the first upstream port. The head end further comprises a second plurality of physical layer components associated with the second upstream channel, wherein the second plurality of physical layer components includes a second upstream port and a second PHY processor, and wherein the second plurality of nodes are physically connected to the second upstream port. According to a specific implementation, the first and second plurality of physical layer components are adapted to allow upstream signals from the first plurality of nodes to be processed by the second PHY processor.

A different embodiment of the present invention is directed to a method for facilitating communication in an access network. The access network includes a head end and a plurality of subscriber groups including a first subscriber group and a second subscriber group. The first subscriber group includes a first plurality of nodes which communicate with the head end via a first upstream channel. The second subscriber group includes a second plurality of nodes which communicate with the head end via a second upstream channel. The head end includes a first plurality of physical layer components associated with the first upstream channel, wherein the first plurality of physical layer components includes a first upstream port and a first PHY processor, and wherein the first plurality of nodes are physically connected to the first upstream port. The head end further includes a second plurality of physical layer components associated with the second upstream channel, wherein the second plurality of physical layer components includes a second upstream port and a second PHY processor, and wherein the second plurality of nodes are physically connected to the second upstream port. The first and second plurality of physical layer components are dynamically configured to allow upstream signals from the first plurality of nodes to be processed by the first PHY processor. The first and second plurality of physical layer components are also dynamically configured to allow upstream signals from the second plurality of nodes to be processed by the second PHY processor. The first and second plurality of physical layer components may then be dynamically re-configured to cause upstream signals from a first portion of the first plurality of nodes to be processed by the second PHY processor. According to different implementations, re-configuration of the first and second plurality of physical layer components may be implemented in response to a variety of factors including, for example, detection of bandwidth resource problems, detection of upstream channel failure, etc.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

As described in greater detail below, the present invention described various techniques which may be used to provide improved access network capabilities, features, and performance, such as, for example, increased network availability, upstream channel load balancing, virtual cabling, etc.

Figure 1:
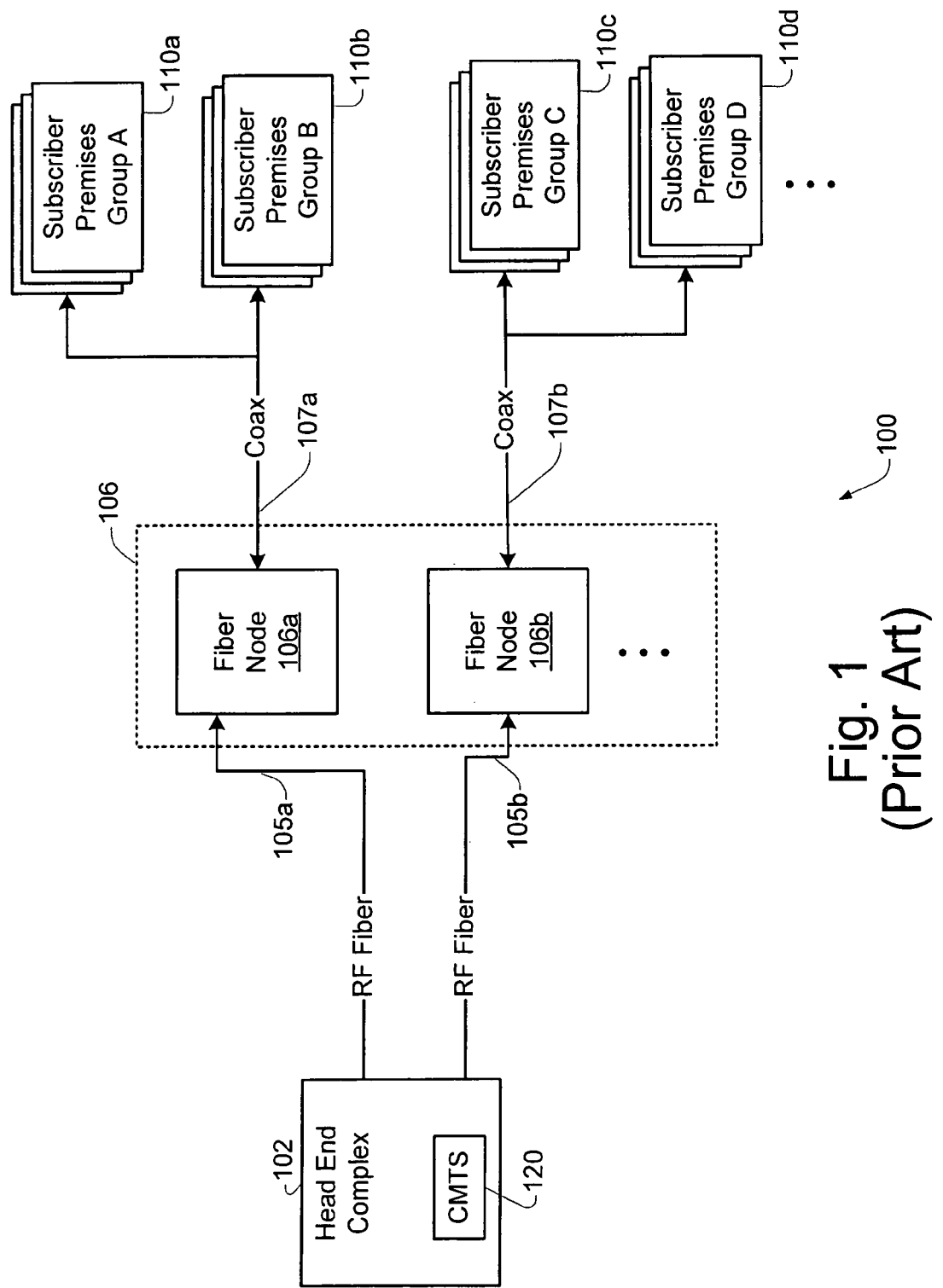
FIG. 1 shows a block diagram of a conventional two-way hybrid fiber-coaxial (HFC) cable network 100.
Figure 2:
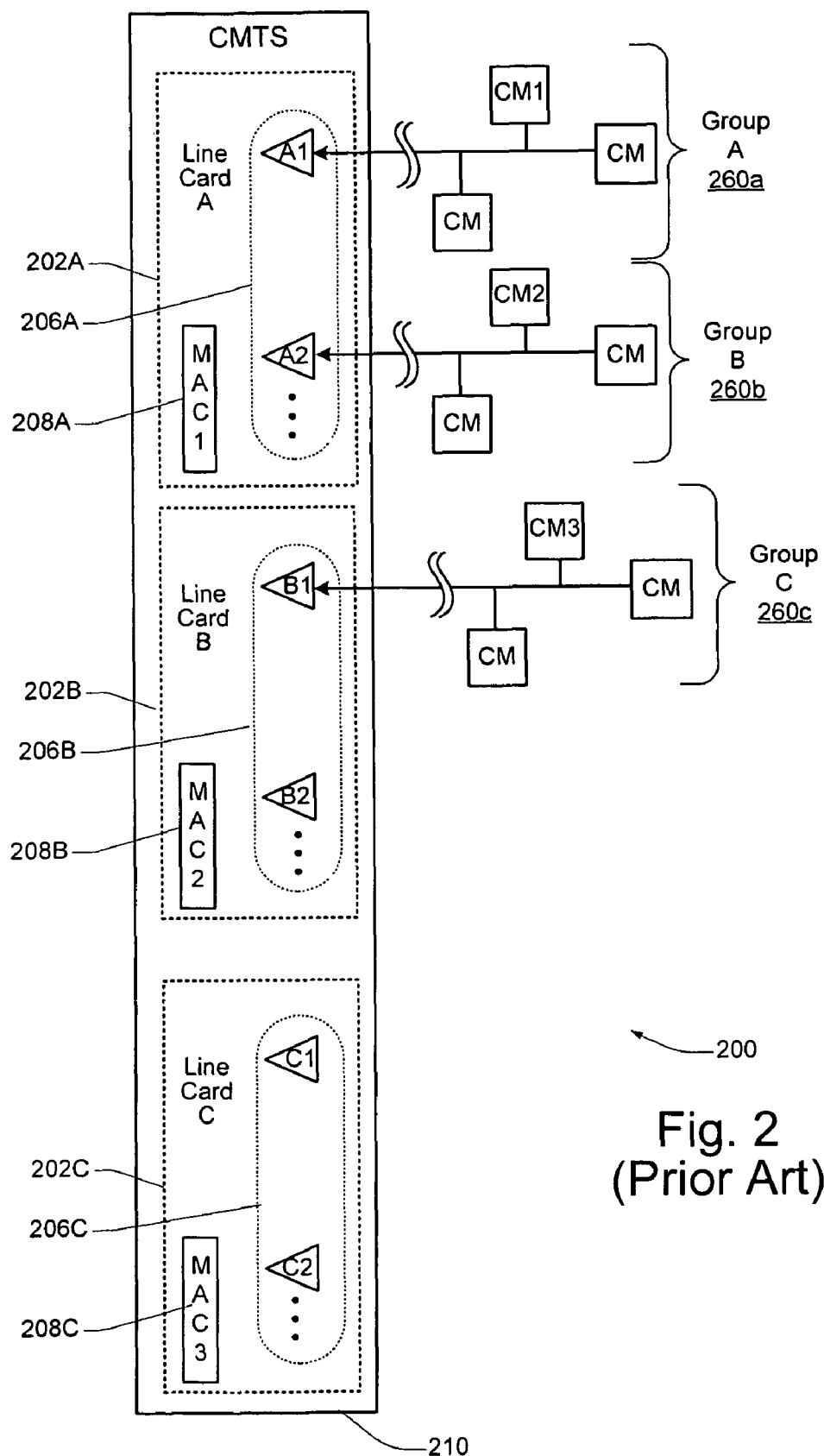
FIG. 2 shows an example of a portion of a conventional cable network 200.
Figure 3:
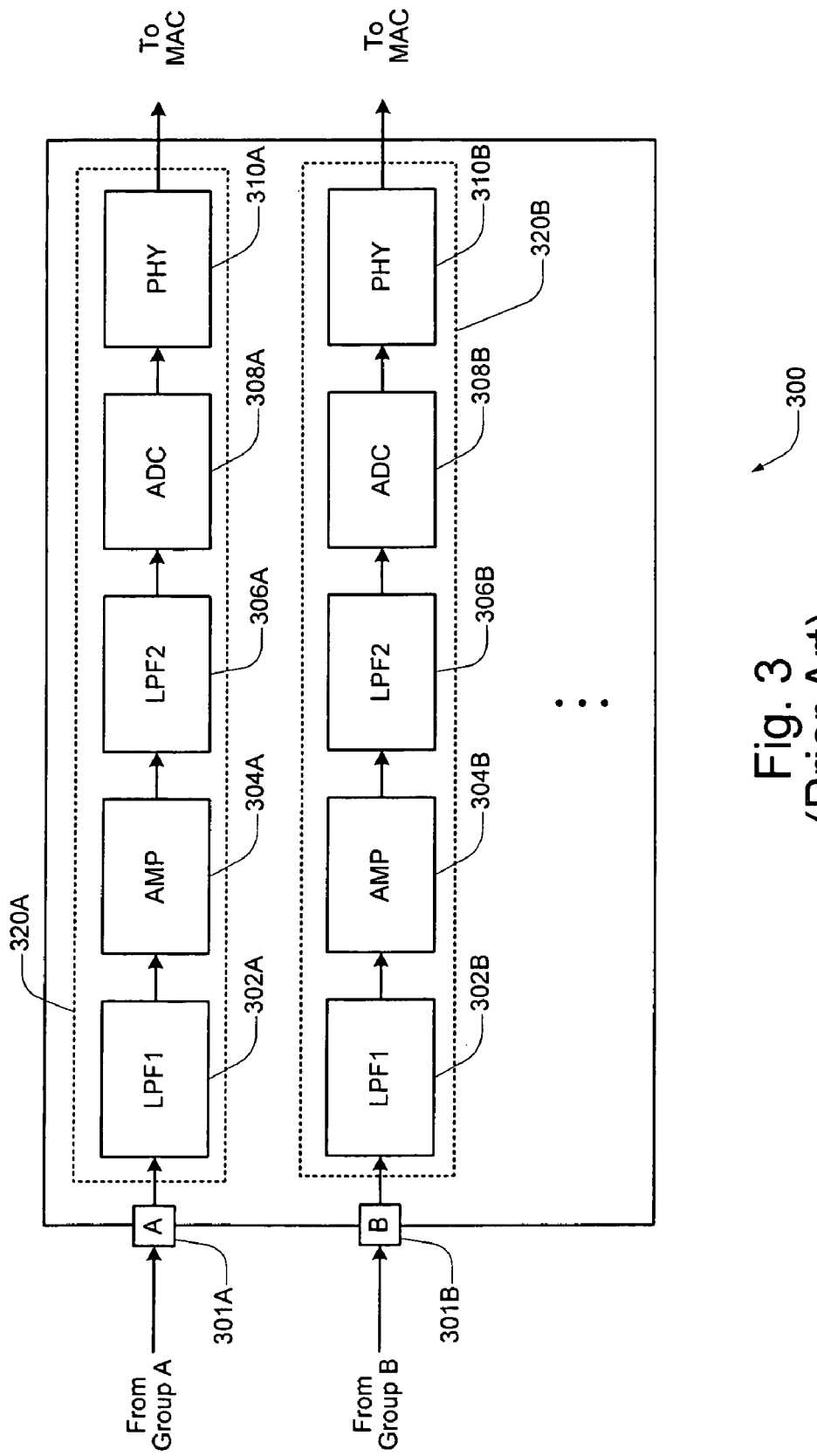
FIG. 3 shows an example of a portion of a conventional line card configuration 300.

In order to more fully appreciate the benefits and advantages of the various embodiments of the present invention, it is helpful to review in greater detail conventional line card and CMTS configurations. FIG. 3 shows an example of a portion of a conventional line card configuration 300. For purposes of this example, the line card 300 (of FIG. 3) may correspond to Line Card A 202A of FIG. 2. In the example of FIG. 3, upstream signals from Group A cable modems to the CMTS are received at upstream Port A 301A. The upstream channel (e.g., U.S.[0]) associated with upstream Port A includes a variety of components 320A which process the upstream signals at the physical (PHY) layer. Such components include, for example, low pass filters (302A, 306A), amplifier (304A), analog-to-digital converter (308A), and PHY chip (310A). After the upstream signals have been processed at the physical layer, the processed information is then sent to the media access control (MAC) layer of the line card.

As illustrated in FIG. 3, each upstream channel of a given line card is implemented via a respective upstream port (e.g., 301A) and a respective set of PHY layer components (e.g., 320A). Further, as described previously, and as shown in FIG. 3, there is no interconnection between the PHY layer components of different upstream channels of a given line card. Traditionally, one advantage of such a configuration is that it permits use of the same upstream channel frequency for different upstream ports on the same line card. Such a feature may be useful, for example, in noisy environments where there are only limited clean (frequency) channels available for use.

As shown in the example of FIG. 3, upstream signals from Group A cable modems are processed only by PHY components 320A, and upstream signals from Group B cable modems are processed only by PHY components 320B. If the PHY chip 310A were to fail, the line card 300 would be unable to process the upstream signals from Group A cable modems, even though it would still be able to process upstream signals from Group B cable modems using PHY components 320B. However, as described in greater detail below, different embodiment of the technique of the present invention may be used to overcome this problem by providing interconnections between PHY layer components of different upstream channels within the same line card. Examples of such embodiments are illustrated in FIGS. 5, 6, and 7 of the drawings.

Figure 5:
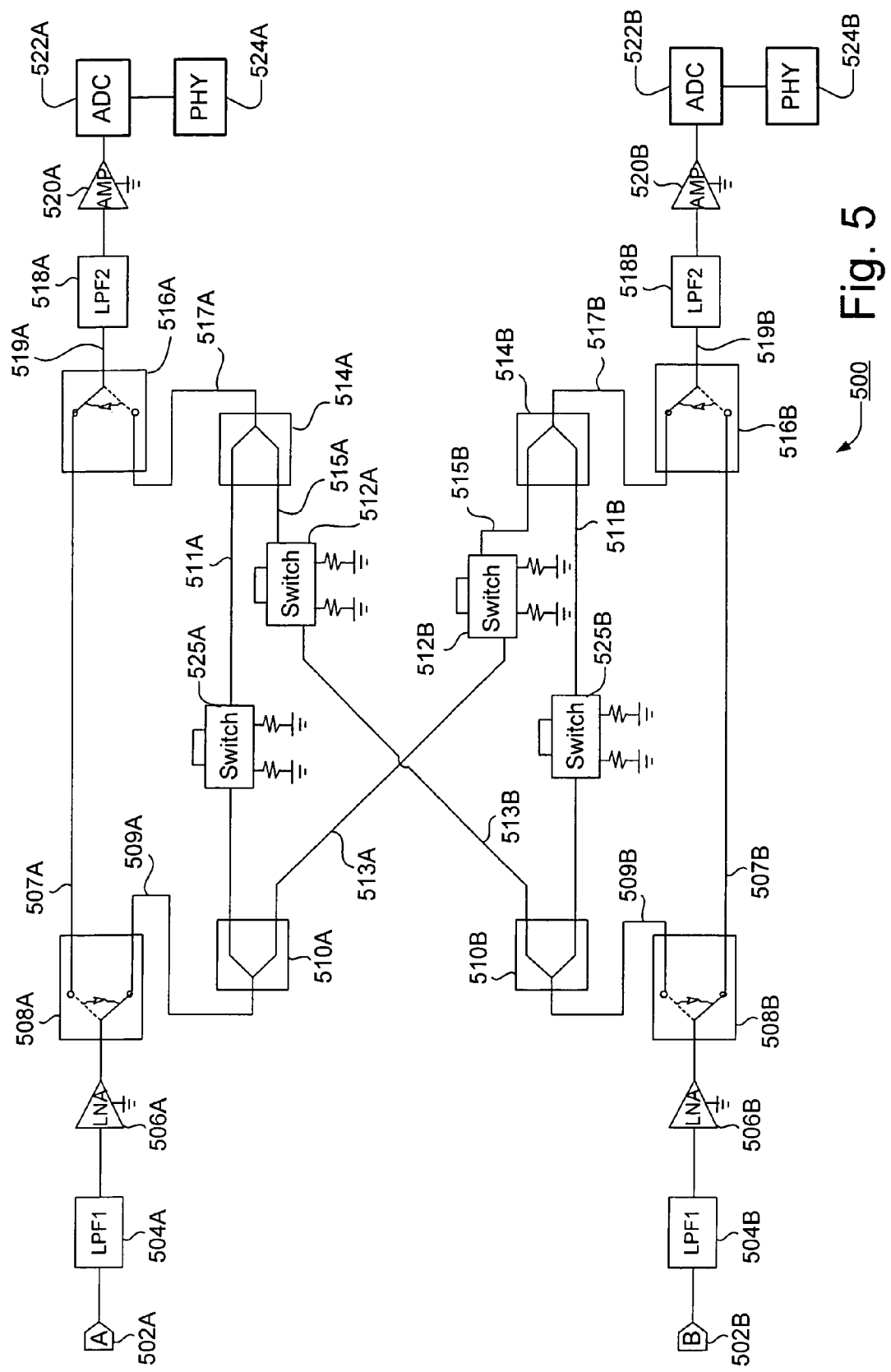
FIGS. 5-7 illustrate alternate embodiments of different line card portions which may be implemented in accordance with the technique of the present invention.
Figure 6:
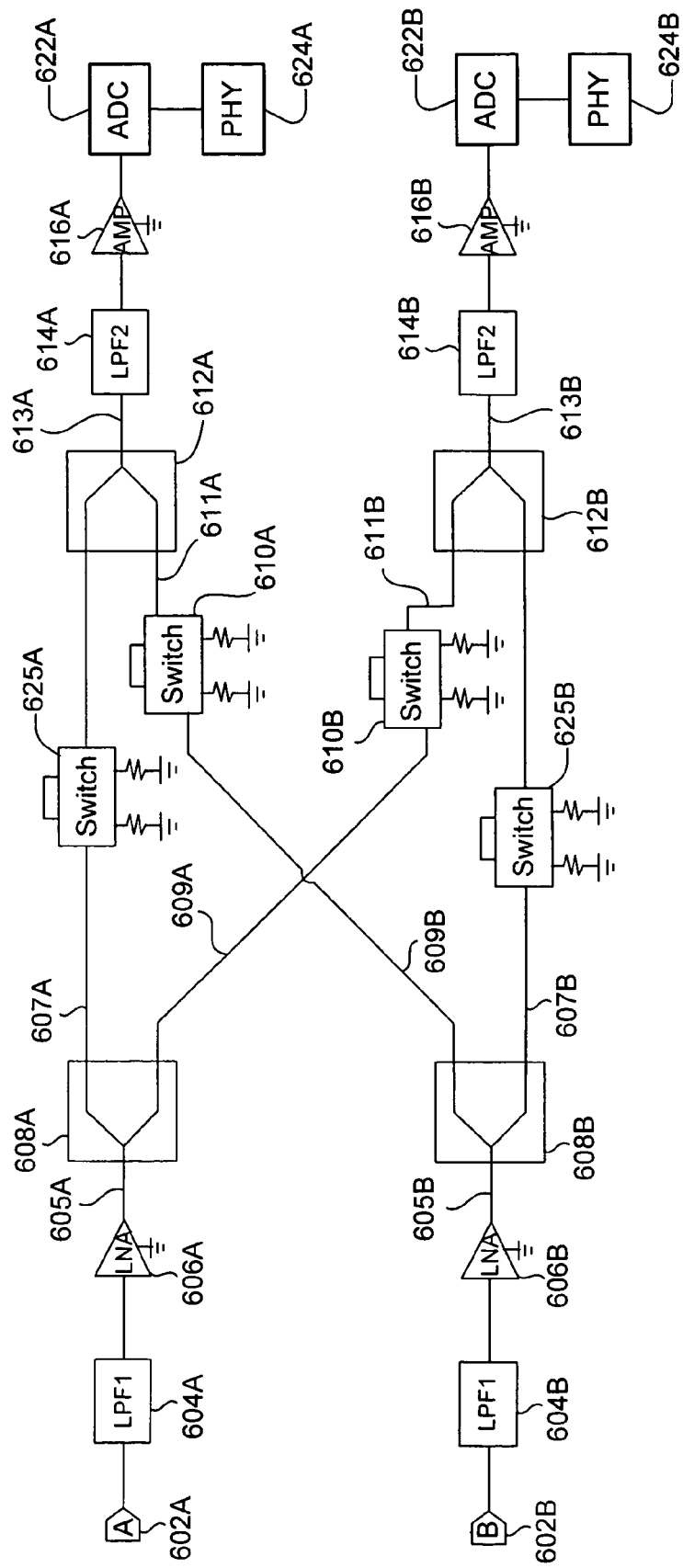
Figure 7:
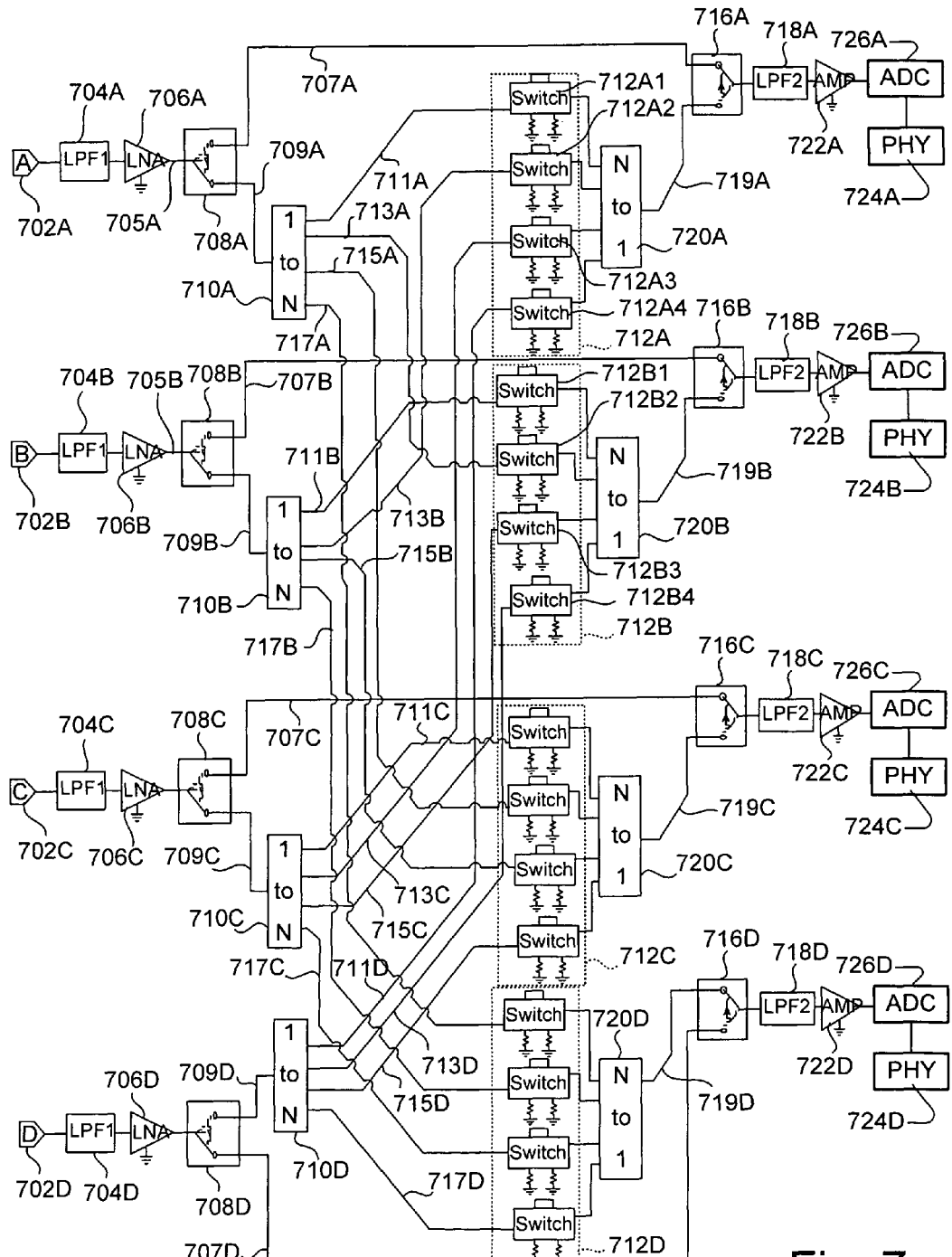

FIGS. 5-7 illustrate alternate embodiments of different line card portions which may be implemented in accordance with the technique of the present invention. Referring first to FIG. 5, a portion 500 of a line card is illustrated in which the PHY layer components of different upstream channels (e.g., US[0] associated with Port A 502A, and a US[1] associated with Port B 502B) are connected in a manner which allows upstream information from cable modems on either of the upstream channels to be processed by the components associated with either of the upstream channels. Thus, for example, upstream information sent from cable modems which are physically connected to upstream Port A 502A and associated with US[0] are able to be processed by the PHY components associated with US[1], and vice versa.

As illustrated in the embodiment of FIG. 5, line card portion 500 may include: one or more the upstream ports 502A, 502B; one or more low pass filters 504A, 504B, 518A, 518B; one or more low noise amplifiers (LNAs) 506A, 506B; one or more switches 508A, 508B, 516A, 516B, 512A, 512B, 525A, 525B; one or more splitters/combiners 510A, 510B, 514A, 514B; one or more variable gain amplifiers 520A, 520B; one or more audio-to-digital (ADC) converters 522A, 522B; one or more PHY chips 524A, 524B; etc. According to a specific implementation, the low pass filters LPF1 and LPF2 of FIG. 5 may be designed to have characteristics similar to corresponding low pass filters used in conventional line card configurations such as that shown, for example, in FIG. 3. Similarly, according to at least one implementation, the upstream ports, variable gain amplifiers, ADCs, and/or PHY chips of FIG. 5 may be designed to have characteristics similar to corresponding components of conventional line card configurations such as that shown, for example, in FIG. 3.

In at least one implementation, the low noise amplifiers 506A, 506B may correspond to low noise amplifiers such as those provided by the vendor Analog Devices of Norwood, Mass., for example. In at least one implementation, switches 508A, 508B, 516A, 516B may correspond to single pole/double throw switches or other types of RF relay switches which have low loss, high isolation properties such as those provided by the vendor OMRON of Toronto, Canada, for example. In at least one implementation, switches 512A, 512B, 525A, 525B may correspond to double pole/double throw switches or other types of RF relay switches which have low loss, high isolation properties such as those provided by the vendor OMRON of Toronto, Canada, for example. In at least one implementation, splitters 510A, 510B and combiners 514A, 514B may correspond to splitters/combiners such as those provided by the vendor Pulse of San Diego Calif., for example.

In order to help appreciate at least some of the features and benefits provided by the line card configuration 500 of FIG. 5, the operation of line card configuration 500 will now be described by way of illustration with reference to FIGS. 9 and 10 of the drawings. In at least one implementation, the techniques illustrated in the examples of FIGS. 9 and 10 may be implemented by software and/or hardware at the CMTS.

Figure 9:
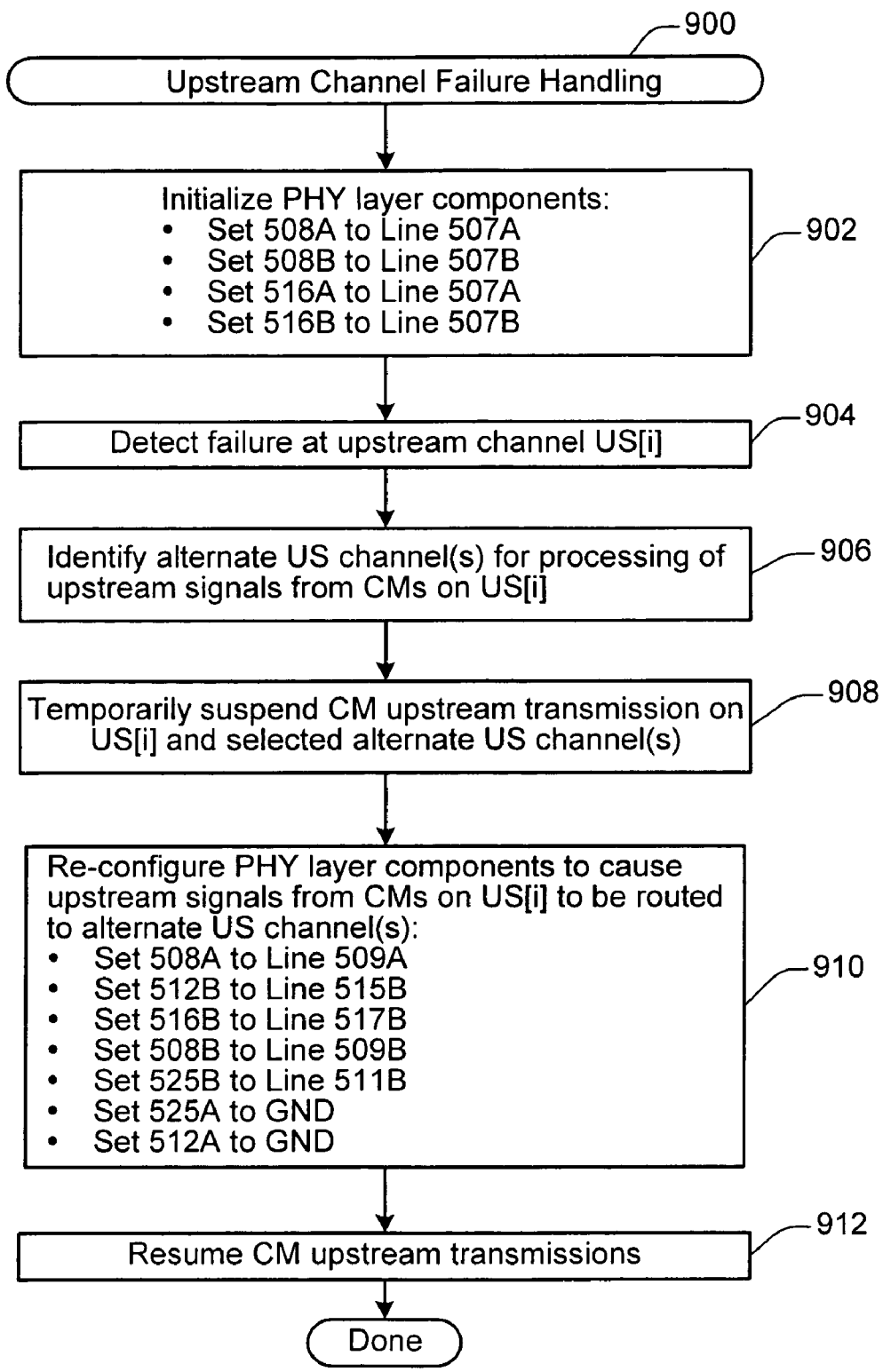
FIG. 9 shows an example of an upstream channel failure handling technique 900 which may be implemented at line card portion 500 of FIG. 5.

FIG. 9 shows an example of an upstream channel failure handling technique 900 which may be implemented at line card portion 500 of FIG. 5. In this example, it is assumed that the upstream channel associated with upstream Port A corresponds to US[0], and the upstream channel associated with upstream Port B corresponds to US[1]. Additionally, in this example, it is assumed that, initially, the PHY components associated with each respective upstream channel are configured to process upstream signals from cable modems associated with that upstream channel. Thus, for example, referring to FIG. 5, upstream signals from cable modems which are physically connected to Port A 502A are processed by PHY layer components corresponding to upstream channel US[0] (which includes PHY chip 524A). Similarly, upstream signals from cable modems which are physically connected to Port B 502B are processed by PHY layer components corresponding to upstream channel US[1] (which includes PHY chip 524B).

Accordingly, as illustrated at 902 (FIG. 9), the PHY layer components of FIG. 5 are initialized as follows: switch 508A is set to line 507A, switch 508B is set to line 507B, switch 516A is set to line 507A, switch 516B is set to line 507B.

Next, in the example of FIG. 9, it is assumed that PHY chip 524A fails at 904. According to a specific embodiment, software and/or hardware at the CMTS may be configured to detect upstream and/or downstream channel failures, and to automatically take appropriate action in response to mitigate problems which may occur as a result of such channel failures. In at least one implementation, software and/or hardware at the CMTS will detect the upstream channel failure, and in response will identify (906) one or more alternate upstream channels for processing. In the example of FIG. 5, upstream channel US[1] may be identified as a suitable alternate upstream channel for processing upstream signals from cable modems on the failed upstream channel.

Once the appropriate alternate upstream channel(s) have been identified, the CMTS may temporarily suspend (908) upstream transmission for cable modems on the failed upstream channel (e.g., US[0]) and the selected alternate upstream channel (e.g., US[1]). Thereafter, at least a portion of the PHY layer components of line card portion 500 of FIG. 5 are reconfigured (910) in order to cause upstream signals from the failed upstream channel to be processed by at least a portion of the PHY layer components associated with the selected alternate upstream channel. In a specific implementation, reconfiguration of the PHY layer components may include: setting switch 508A to line 509A, setting switch 512B to line 515B, setting switch 516B to line 517B, setting switch 508B to line 509B, setting switch 525B to line 511B, setting switch 512A to GND, setting switch 525A to GND, etc.

After reconfiguration of the appropriate PHY layer components has been implemented, upstream transmission of signals from cable modems on both US[0] and US[1] may resume (912). In at least one implementation, it may be necessary for the US[0] cable modems to re-register on upstream channel US[1].

As a result of the reconfiguration of the PHY layer components, upstream CM signals arriving at upstream Port A 502A will be directed to low pass filter 504A, low noise amplifier 506A, switch 508A, splitter 510A, switch 512B, combiner 514B, switch 516B, low pass filter 518B, amplifier 520B, ADC 522B, and will eventually be processed by PHY chip 524B. In this way, upstream signals from cable modems which had been assigned to US[0] and physically connected to Port A may be processed by PHY chip 524B, which is associated with upstream channel US[1]. Additionally, according to the reconfigured line card configuration of FIG. 5, upstream signals from cable modems on upstream channel US[1] are received at upstream Port B and are directed to low pass filter 504B, low noise amplifier 506B, switch 508B, splitter 510B, switch 525B, combiner 514B, switch 516B, low pass filter 518B, amplifier 520B, ADC 522B, and are eventually processed by PHY chip 524B.

It is noted that, in the line card reconfiguration operation at 910 of FIG. 9, switch 512A is set to ground (i.e., GND), which results in signals on line 513B terminating at switch 512A. In at least one implementation, termination of a cable modem RF signal at switch 512A may be achieved by grounding the signal via a resistive load such as, for example, a 75 Ohm resistor. It is also noted that upstream CM signals arriving at upstream Port A 502A will be directed from splitter 510A to switch 525A, which has been set to terminate (GND) the upstream signals at this point. An additional benefit of switch 525A (and 525B) is that it helps to remove unnecessary RF reflection from failed components, such as PHY chip 524A, for example.

The example of FIG. 9 illustrates how the technique of the present invention may be used to handle upstream channel failures. In addition to this feature, the technique of the present invention may also be used to implement other features which cannot be provided by conventional line card configurations. One such additional feature relates to upstream channel load balancing, the example of which is illustrated in FIG. 10 of the drawings.

Figure 10:
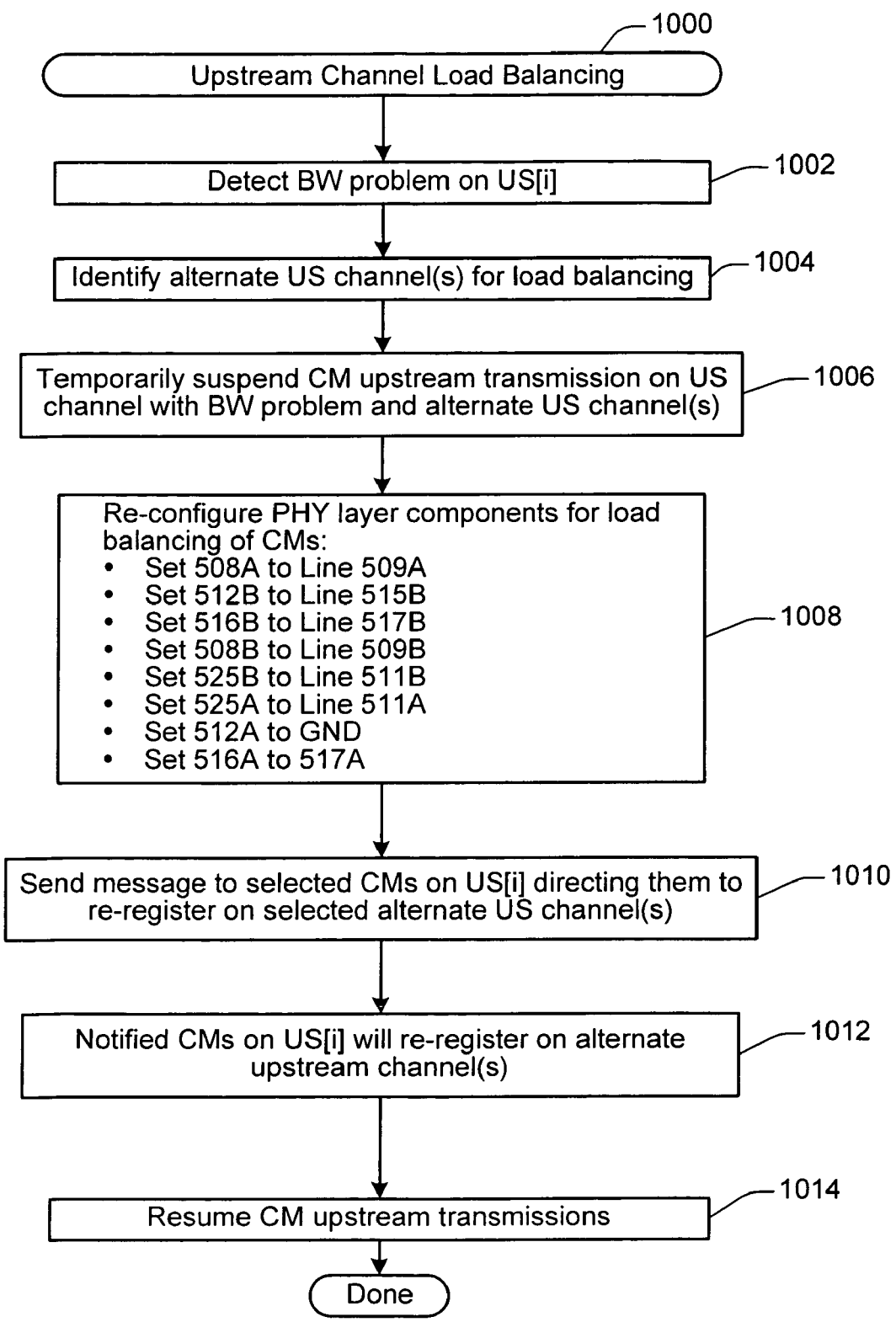
FIG. 10 shows an example of an upstream channel load balancing technique 1000 in accordance with a specific embodiment of the present invention.

FIG. 10 shows an example of an upstream channel load balancing technique 1000 in accordance with a specific embodiment of the present invention. According to at least one implementation, the upstream channel load balancing technique of FIG. 10 may be used to implement upstream channel load balancing of cable modems across different upstream channels of a given line card. For purposes of illustration, the upstream channel load balancing technique of FIG. 10 will be described by way of example with respect to FIG. 5 of the drawings.

In this example, it is initially assumed that line card portion 500 services cable modems from two different subscriber groups, namely Subscriber Group A and Subscriber Group B. Subscriber Group A includes a plurality of cable modems which are physically connected to upstream Port A 502A and assigned to upstream channel US[0]. Subscriber Group B includes a plurality of cable modems which are physically connected to upstream Port B 502B and assigned to upstream channel US[1]. The PHY layer components of line card portion 500 have initially been configured according to the initialization operation described at 902 of FIG. 9. It is further assumed that a substantial number of additional cable modem subscribers have been added to Subscriber Group A, which results in bandwidth problems occurring on upstream channel US[0].

According to a specific implementation, the CMTS software may be configured to monitor the throughput of information associated with each upstream channel of each line card within the CMTS. When the CMTS detects (1002) bandwidth problems on upstream channel US[0], it may respond by identifying (1004) one or more alternate upstream channel(s) to be used for cable modem load balancing. In the line card configuration example of FIG. 5, the selected alternate upstream channel is upstream channel US[1], which is associated with upstream Port B.

After the appropriate alternate upstream channel has been identified, the CMTS may temporarily suspend (1006) cable modem upstream transmission on the identified problem with bandwidth channel (e.g., US[0]) and the identified alternate upstream channel(s) (e.g., US[1]). Thereafter, selected PHY layer components of line card portion 500 may be reconfigured (1008) for implementation of cable modem load balancing along the identified upstream channels. According to a specific implementation, reconfiguration of the PHY layer components may include, for example: setting switch 508A to line 509A, setting switch 512B to line 515B, setting switch 516B to line 517B, setting switch 508B to line 509B, setting switch 525B to line 511B, setting switch 512A to GND, setting switch 525A to line 511A, setting switch 516A to 517A, etc.

After reconfiguration of the PHY layer components has been achieved, selected cable modems on the identified bandwidth problem upstream channel(s) may then be directed to re-register (1010) on designated alternate upstream channel(s). For example, referring to FIG. 5, selected Subscriber Group A cable modems on US[0] may be directed to re-register on alternate upstream channel US[1] in order, for example, to effect load balancing of bandwidth utilization on US[0] and US[1]. According to at least one implementation, the CMTS may be configured or designed to direct the selected modems to re-register on the designated alternate upstream channel(s). The notified cable modems will then re-register (1012) on the designated alternate upstream channel(s). In at least one implementation, re-registration may be achieved using conventional cable modem registration techniques such as those described, for example, in the DOCSIS protocol. After the re-registration process has been completed, the cable modems on the affected upstream channels (e.g., US[0] and US[1]) may then resumed (1014) upstream channel transmissions.

As a result of implementing the upstream channel load balancing technique of FIG. 10, the PHY chip 524A and PHY chip 524B will each receive upstream signals from the selected cable modems in Subscriber Group A which were instructed to re-register on US[1]. According to at least one implementation, MAC software at the CMTS may be designed to determine which of the duplicate upstream channel signals (received at both PHY chip 524A and PHY chip 524B) are to be passed to the MAC controller for processing and which signals are to be ignored.

FIG. 6 shows an alternate embodiment of a line card portion 600 which may be used to implement various techniques of the present invention, such as those described above, for example, with respect to FIGS. 9 and 10. According to at least one implementation, the PHY layer components used in the line card implementation of FIG. 6 are similar to the respective PHY layer components described above with respect to FIG. 5.

It is noted that the line card configuration of FIG. 6 is similar to the line card configuration of FIG. 5. For example, low pass filters 604A, 604B, 614A, 614B; LNAs 606A, 606B; splitters 608A, 608B; combiners 612A, 612B; switches 610A, 610B, 625A, 625B; amplifiers 616A, 616B, ADCs 622A, 622B, etc., may be implemented using components similar to those described previously with respect to FIG. 5 of the drawings. Additionally, as with line card portion 500, the PHY layer components associated with two different upstream channels of line card portion 600 are connected in a manner which provides the ability for cable modems on either of the upstream channels to be configured to communicate with either one of the PHY chips (624A, 624B), as desired.

It will be appreciated, however, that the line card implementation of FIG. 6 is simpler in design than that of FIG. 5 (e.g., it has been designed in a manner which omits switches 508A, 508B, 519A, 519B of FIG. 5). Accordingly, the line card configuration of FIG. 6 may be less costly to manufacture than that of FIG. 5. However, the line card configuration of FIG. 6 may also result in higher signal loss because the received RF signals are split, for example, at splitters 608A, 608B. This signal loss may be compensated for by increasing the gain of LNA amplifiers 606A, 606B, for example.

It will be appreciated that, in alternate embodiments, the upstream channel load balancing technique described in FIG. 10 may also be used to implement other features such as, for example, quality of service (QoS) channel allocation, virtual cabling, etc.

For example, it may be desirable to provide different quality levels of service on different upstream channels, whereby cable modem subscribers in a given subscriber group which pay for a higher quality of service are assigned to upstream channels which have greater bandwidth availability, and other cable modem subscribers in the subscriber Group which pay for a lower quality of service are assigned to upstream channels which have less bandwidth availability.

In virtual cabling applications, for example, it may be desirable to configure the PHY layer components of FIG. 5 in a manner which allows cable modems physically connected to Ports A and B to be able to communicate with either of the PHY chips 524A, 524B. As described in greater detail below, it is also possible for cable modems physically connected to Ports A and B (502A, 502B) to be able to communicate with other PHY chips on other line cards within the CMTS chassis.

FIG. 7 shows an example of a line card implementation 700 in accordance with a specific embodiment of the present invention. The example of FIG. 7 illustrates a line card portion 700 in which the PHY layer components associated with four different upstream channels are connected in a manner which provides the ability for cable modems on any of the upstream channels to be configured to communicate with any desired PHY chip (e.g., 724A, 724B, 724C, 724D) of line card portion 700. Accordingly, it will be appreciated that line card portion 700 may be used to provide benefits and/or features similar to those described above with respect to FIGS. 5 and 6 such as, for example, upstream channel failure handling, upstream channel load balancing, virtual cabling, etc.

According to at least one implementation, the PHY layer components illustrated in FIG. 7 may be similar to the PHY layer components used in the line card implementations of FIGS. 5 and 6. Thus, for example, line card portion 700 includes a plurality of upstream ports (e.g., 702A), a first plurality of low pass filters (e.g., 704A), a plurality of LNAs (e.g., 706A), a first plurality of switches (e.g., 708A, 716A), a plurality of 1-to-N splitters (e.g., 710A), a second plurality of switches (e.g., 712A1), a plurality of N-to-1 combiners (e.g., 720A), a second plurality of low pass filters (e.g., 718A), the plurality of gain amplifiers (e.g., 722A), a plurality of ADCs (e.g., 726A), a plurality of PHY chips (e.g., 724A), etc.

It will be appreciated that alternate implementations of the present invention (not shown) may include line card configurations in which PHY layer components associated with any number of upstream channels of a given line card may be connected. For example, FIG. 7 may be a modified by one having ordinary skill in the art to include any desired number of upstream ports in which the PHY layer components associated with each respective upstream port are connected in a manner to provide the benefits/features of the present invention as described herein. Additionally, it will be appreciated that the upstream channel failure handling technique and upstream channel load balancing technique described in FIGS. 9 and 10 may also be modified by one having ordinary skill in the art in order to adapt such techniques to the 4-channel line card configuration of FIG. 7 and/or the n-channel line card configurations of alternate embodiment of the present invention. For purposes of simplification only a portion of the PHY layer components of FIG. 7 have been described herein.

It will be appreciated that alternate embodiments of the present invention not shown) may include fewer components than those illustrated in FIGS. 5-7, may include different components than those illustrated in FIGS. 5-7, and/or may include additional components not illustrated in FIGS. 5-7. To the extent that such alternate embodiments would be generally known to one having ordinary skill in the art, such alternate embodiments are considered to be within the scope of the present invention.

As described above, the technique of the present invention provides numerous advantages/benefits over conventional line card configurations. For example, conventional line card configurations do not provide the feature of upstream channel backup or redundancy protection. Thus, for example, when a failure occurs at a PHY chip on a conventional line card, cable modems which were physically connected to the failed PHY chip will be unable to communicate with the CMTS. Typically, in order to remedy such a problem, the entire line card will have to be replaced, resulting in service disruptions for all cable modem groups associated with that line card. However, as described above, the inventive line card configuration of the present invention may be used to provide upstream channel "high availability" protection whereby the cable modems of a failed upstream channel may be immediately and dynamically reassigned to an alternate upstream channel in order to minimize service disruption. Another benefit of the inventive line card configuration of the present invention is its ability to provide load balancing capabilities across multiple upstream channels associated with one or more line cards. Moreover, such load balancing capability may be used to reassign cable modems (which are physically connected to a fixed upstream port) to alternate upstream channels.

Another benefit of the present invention is that it may be used to provide the feature of virtual cabling. According to one embodiment, the feature of virtual cabling may be used to dynamically configure via software cable modems from any selected subscriber group to "talk" to any desired PHY chip on any line card within the CMTS. One such implementation of this feature is illustrated, for example, in FIG. 4 of the drawings.

Figure 4:
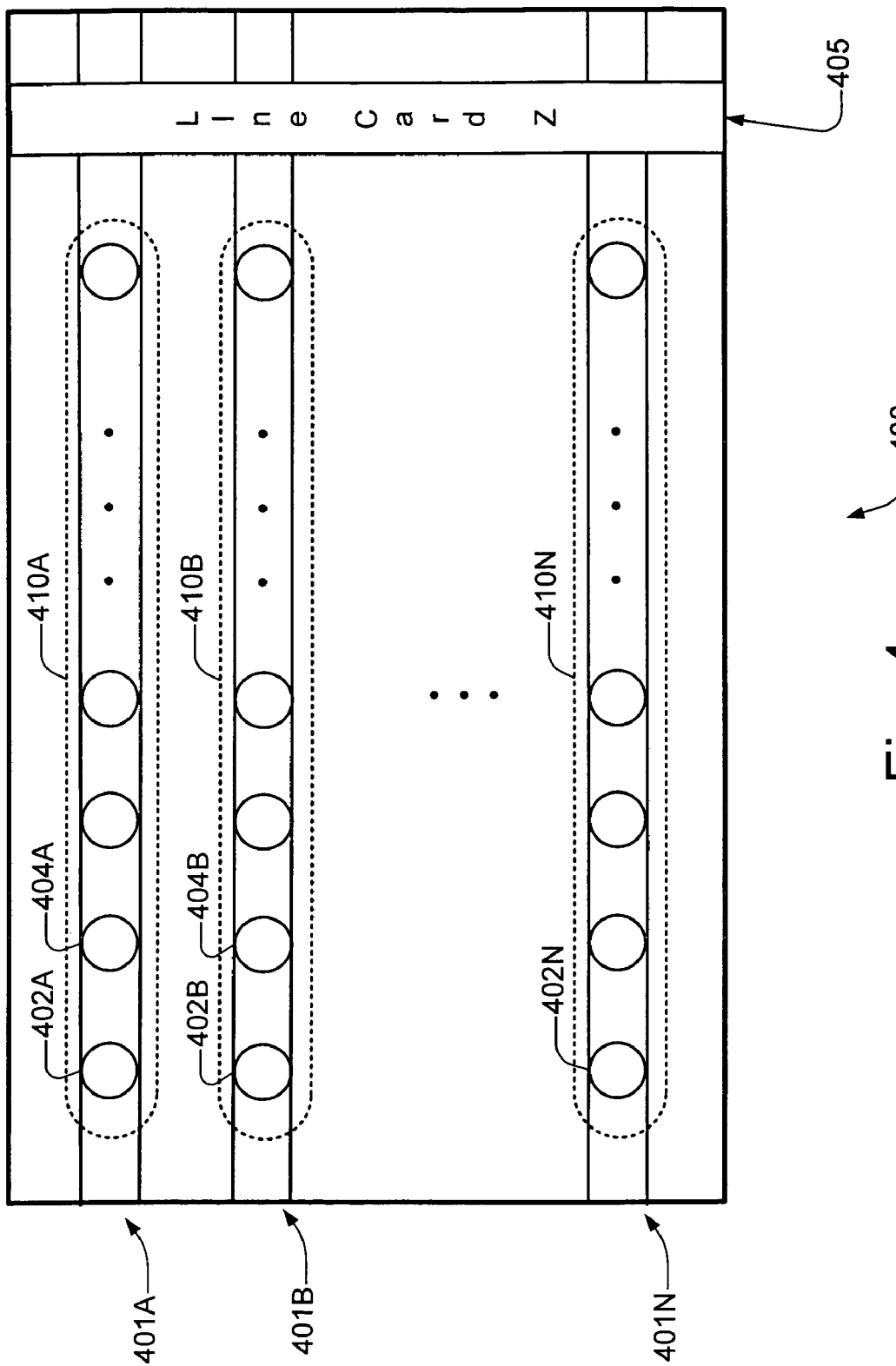
FIG. 4 shows an example of line card configurations within CMTS portion 400 in accordance with a specific embodiment of the present invention.

FIG. 4 shows an example of line card configurations within CMTS portion 400 in accordance with a specific embodiment of the present invention. As illustrated in FIG. 4, CMTS portion 400 may include a plurality of individual line cards 401A, 401B, 401N. Each line card 401A, 401B, 401N includes a respective plurality of ports (e.g., 410A, 410B, 410N) for communicating with cable modems. According to at least one implementation, at least a portion of the plurality of individual line cards 401A, 401B, 401N may be configured in a manner similar to that shown, for example, in line card portion 700 of FIG. 7, wherein at least a portion of the PHY layer components of each line card are interconnected. Additionally, as illustrated in FIG. 4, CMTS portion 400 includes a cross-connect line card, namely Line Card Z 405. According to one implementation, Line Card Z may include a plurality of PHY layer components which are configured in a manner similar to that shown, for example, in line card portion 700 of FIG. 7, not including the plurality of ADCs (e.g. 726A, 726B, 726C, 726D) or the plurality of PHY chips (e.g. 724A, 724B, 724C, 724D). According to at least one embodiment, Line Card Z 405 may be configured or designed to provide a connection between each line card 401A, 401B, 401N (or selected line cards) in CMTS portion 400. In this way, cable modems from any selected subscriber group are able to be dynamically configured via software to "talk" to any desired PHY chip on any desired line card within the CMTS.

In alternate embodiments, CMTS 400 may include a plurality of cross-connect line cards similar to Line Card Z 405, wherein total number of cross-connect line cards is related to the number of US ports on each line card. For example, in a specific implementation where line card 401A, 401B, and 401N each include 8 upstream ports, the CMTS 400 may include 8 cross-connect line cards, wherein a first cross-connect line card is adapted to connect to upstream ports 402A, 402B (on line cards 401A, 401B) to line card 401N, a second cross-connect line card is adapted to connect to upstream ports 404A, 404B to line card 401N, etc.

Moreover, it will be appreciated that the configuration of FIG. 4 provides additional benefits with respect to high availability and load balancing capabilities. For example, using the configuration of FIG. 4, cable modems on a failed upstream channel may be immediately and dynamically reassigned to an alternate upstream channel associated with any desired line card within CMTS portion 400. Additionally, the configuration of FIG. 4 also provides the ability to implement load balancing operations across multiple upstream channels associated with one or more line cards within CMTS portion 400.

According to at least one embodiment, synchronization between the various line cards within CMTS portion 400 may be achieved using a variety of line card synchronization techniques, such as, for example, the line card synchronization techniques described in U.S. patent application Ser. No. 09/490,761 to Crocker et. al., herein incorporated by reference in its entirety for all purposes.

CMTS Configurations

Generally, the various techniques of the present invention may be implemented on software and/or hardware. A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 11:
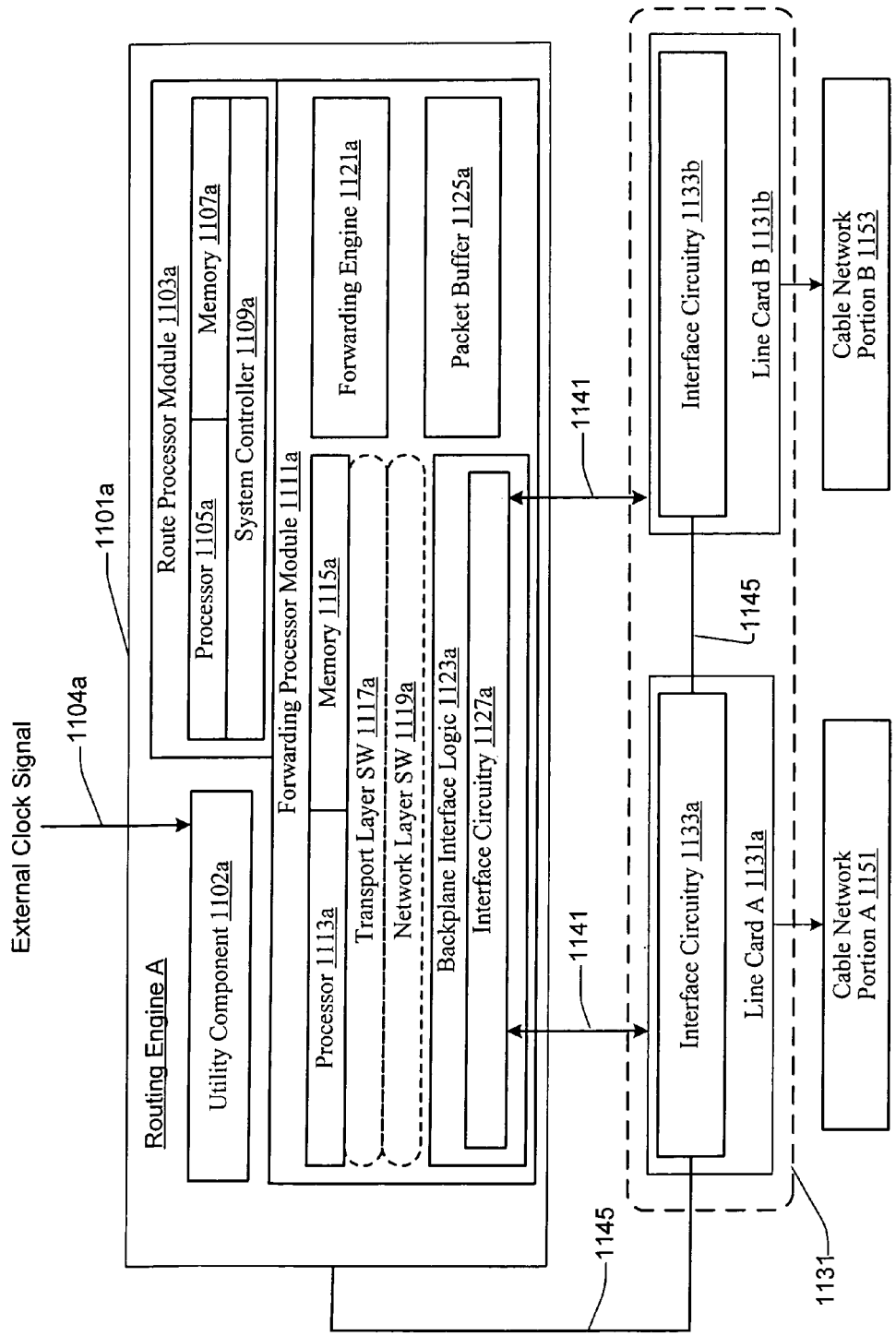
FIG. 11 shows a block diagram of a specific embodiment of a Cable Modem Termination System (CMTS) 1100 which may be used to implement certain aspects of the present invention.

FIG. 11 shows a block diagram of a specific embodiment of a Cable Modem Termination System (CMTS) 1100 which may be used to implement certain aspects of the present invention. As shown in FIG. 11, the CMTS 1100 may comprise at least one routing engine (e.g. Routing Engine A 1101a). In a specific implementation, Routing Engine A 1101a may be configured as a primary or working routing engine.

According to a specific embodiment, Routing Engine A may be configured or designed to include a plurality of functionally different modules or components, including, for example, a Forwarding Processor (FP) Module 1111a adapted to provide packet forwarding functionality; a Route Processor (RP) Module 1103a adapted to implement routing or forwarding operations; a utility component 1102a adapted to provide system clock and timestamp functionality; etc. The routing engine components provide may be configured to provide layer one, layer two, layer three and layer four functionality as well as quality of service (QoS) functionality.

According to a specific implementation, the RP Module 1103a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 11, the RP Module 1103a comprises a general-purpose processor 1105a (e.g., a MIPS route processor) coupled to a system controller 1109a and memory 1107a. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 1107a may comprise synchronous dynamic random access memory (SDRAM) storage locations addressable by the processor 1105a for storing software programs and data structures accessed by the components. A network routing operating system, portions of which may reside in memory and executed by the route processor, functionally organizes the router by invoking network operations in support of software processes executing on the router.

The RP processor 1105a may be configured to construct and load routing tables used by the FP Module 1111a. The processor 1105a may also be configured or designed to perform configuration management functions of the routing engine 1101a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 1127a may be coupled to the respective interface circuitry 1133a, 1133b of line cards 1131a, 1131b. According to a specific implementation, interface circuitry 1127a may be configured to reside on a backplane logic circuit 1123a of the routing engine. In one example, the backplane logic circuit 1123a is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 1125a and a forwarding engine 1121a of the FP Module 1111a. The packet buffer 1125a may include memory which is configured to store packets as the forwarding engine 1121a performs its packet forwarding functions. For example, the packet buffer may be used to store low priority data packets while high priority, low latency voice packets are forwarded by the forwarding engine to a data network interface. According to various embodiments, the FP Module 1111 may comprise a processor 1113a and memory 1115a for handling transport layer 1117 and network layer 1119 functionality. In one implementation, the processor 1113a may be configured to track accounting, port, and billing information for various users on a cable modem network 1151. The processor 1113a may also be configured to maintain desired service flow or session state information in memory 1115a such as, for example, for voice calls initiated over the cable modem network. The FP Module 1111a may also be configured to provide transaction compacting functionality, data parcel tunneling functionality, switching functionality, high availability functionality, load balancing functionality, virtual cabling functionality, etc.

According to a specific implementation, Routing Engine A 1101a may be connected to other routing engines (not shown) via at least one link, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine may then take over the operations of the working routing engine. Thereafter, when Routing Engine A recovers, it may assume the functions of the redundant routing engine, or it may take over the functions of the working routing engine.

According to different embodiments of the present invention, Routing Engine A may be configured or designed to communicate with a plurality of line cards (e.g. 1131) via point-to-point links. For example, as shown in FIG. 11, each of the plurality of line cards 1131 are connected to Routing Engine A via point-to-point links 1141. One advantage of the point-to-point link configuration is that it provides additional reliability in that the failure of one or more line cards will not interfere with communications between other line cards and the routing engine(s). For example, if Line Card A 1131a suddenly failed, the routing engine would still be able to communicate with the other line cards.

According to a specific embodiment, the plurality of line cards may include different types of line cards which have been specifically configured to perform specific functions. For example, line cards 1131 may correspond to radio-frequency (RF) line cards which have been configured or designed for use in a cable network. Alternatively, a portion of line cards 1131 may correspond to network interface cards which have been configured or designed to interface with different types of external networks (e.g. WANs, LANs,) utilizing different types of communication protocols (e.g. Ethernet, Frame Relay, ATM, TCP/IP, etc). For example, a data network interface functions as an interface component between external data sources and the cable system. The external data sources transmit data to the data network interface via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 1119a.

According to a specific implementation, the operations associated with obtaining an IP address for cable modems may be implemented by the network layer software. This may involve the CMTS communicating with a DHCP server (not shown) via a data network interface, for example.

As shown in FIG. 11, at least a portion of the line cards includes interface circuitry for providing an appropriate interface between the host line card, other line cards, and/or routing engine(s). For example, interface circuitry 1133a may include interconnect ports coupled to one or more of the point-to-point links 1141. According to a specific implementation, the interface circuitry functions as a translator that converts conventional formats of data received at the line cards to a suitable protocol format for transmission from the line card to the appropriate routing engine. In one implementation, the interface circuitry 1133*a* may also include circuitry to perform cyclic redundancy code (CRC) generation and checking on packets, along with interconnect format checking.

According to a specific embodiment, the point-to-point links 1141 may be configured as clock forwarded links such that each point-to-point link comprises a at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engine (1101*a*) and a portion of the cable network. A data network interface may couple the routing engine 1101*a* to an external data network 1155 such as, for example, the Internet.

According to one embodiment, all or selected lines cards, routing engines and/or data network interfaces may be configured to use at least one common dedicated line or backplane (e.g. 1145). According to other embodiments, the routing engine 1101*a* may have an additional dedicated connection(s) for supporting redundancy. In a specific implementation, the backplane may be configured as an Ethernet medium that is shared by the CMTS. When the line cards are inserted into the backplane, they communicate with the routing engine over the lines 1145 in accordance with a "capabilities" exchange that identifies the types of line cards and their various characteristics/parameters.

According to a specific implementation, during initialization of the CMTS, the routing engine 1101*a* may negotiate for working routing engine status over the backplane. Assertion of working status causes the line cards 1131 to configure their respective interface circuitry to communicate with the designated working routing engine (e.g. Routing Engine A 1101*a*). The Routing Engine A 1101*a* then configures the CMTS and line cards, establishes routing relationships, and initiates traffic forwarding operations.

The various techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 11 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 1107*a*, 1115*a*, etc.) configured to store program instructions for the network operations and other functions of the present invention described herein. The program instructions may specify an operating system and one or more applications, for example. Such memory or memories may also be configured to store data structures, and/or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
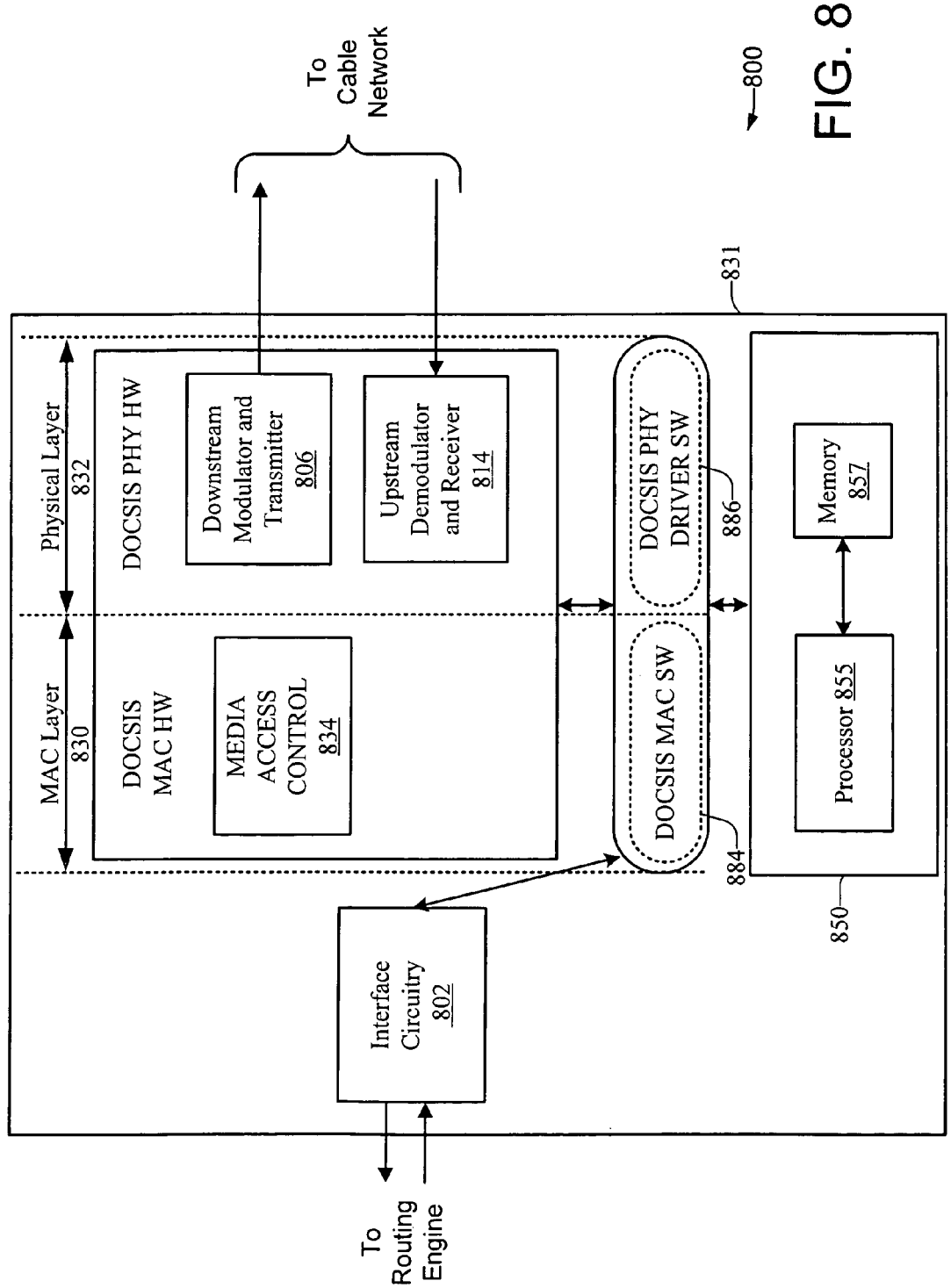
FIG. 8 shows a specific embodiment of a line card 800 which may be used for implementing certain aspects of the present invention.

FIG. 8 shows a specific embodiment of a line card 800 which may be used for implementing certain aspects of the present invention. According to a specific embodiment, the line card 800 may be configured or designed to implement selected aspects of the DOCSIS functionality which were conventionally implemented by the CMTS, such as, for example, DOCSIS MAC functionality.

In the specific embodiment as shown in FIG. 8, line card 800 provides functions on several network layers, including a physical layer 832, and a Media Access Control (MAC) layer 830. Generally, the physical layer is responsible for receiving and transmitting RF signals on the cable plant. Hardware portions of the physical layer include at least one downstream modulator and transmitter 806 and/or at least one upstream demodulator and receiver 814. The physical layer also includes software 886 for driving the hardware components of the physical layer. According to at least one embodiment, the PHY layer components illustrated in FIGS. 5-7 may reside at the physical layer 832 of line card 800.

Upstream optical data signals (packets) arriving via an optical fiber node are converted to electrical signals, and then demodulated by the demodulator/receiver 814. The demodulated information is then passed to MAC layer block 830.

A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 830 includes a MAC hardware portion 834 and a MAC software portion 884. The MAC layer software portion may include software relating to DOCSIS MAC functionality, high availability functionality, load balancing functionality, virtual cabling functionality, etc. The MAC layer hardware and software portions operate together to provide the above-described DOCSIS MAC functionality. In a preferred embodiment, MAC controller 834 is dedicated to performing some MAC layer functions, and is distinct from processor 855.

After MAC layer block 830 has processed the upstream information, it is then passed to interface circuitry 802. As described previously, interface circuitry 802 includes the appropriate hardware and/or software for converting data formats received at the line cards to a suitable protocol format for transmission from the line card to an appropriate routing engine.

When a packet is received from the routing engine at the interface circuitry 802, the packet is then passed to MAC layer 830. The MAC layer 830 transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

As shown in FIG. 8, line card 800 includes a central hardware block 850 including one or more processors 855 and memory 857. These hardware components interact with software and other hardware portions of the various layers within the line card. They provide general purpose computing power for much of the software. Memory 857 may include, for example, I/O memory (e.g. buffers), program memory, shared memory, etc. One or more data structures used for implementing the technique of the present invention may reside in such memory. In one embodiment, the software entities 882, 884, and 886 are implemented as part of a network operating system running on hardware 850. According to a specific embodiment, at least a part of the functionalities of this invention are implemented in software as part of the operating system. In FIG. 8, such software may be part of MAC layer software 884, or may be closely associated therewith. Of course, the logic of the present invention could reside in hardware, software, or some combination of the two.

According to a specific implementation, the procedures typically employed by the CMTS during registration and pre-registration may be performed at the MAC layer of the line card 800. In such an embodiment, most of the registration operations may be performed by the hardware and software provided for MAC layer logic 830.

It will be appreciated that, according to a specific embodiments, at least a portion of functions described herein which are performed by the CMTS (e.g. FIG. 11), line cards (e.g. FIG. 8), and/or selected components thereof, may be implemented in a centralized CMTS system (e.g. residing at the Head End Complex of the cable network), and/or may be implemented at one or more distributed CMTS (DCMTS) systems (e.g. residing at one or more fiber nodes).

Further, it will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

Other Embodiments

Figure 12:
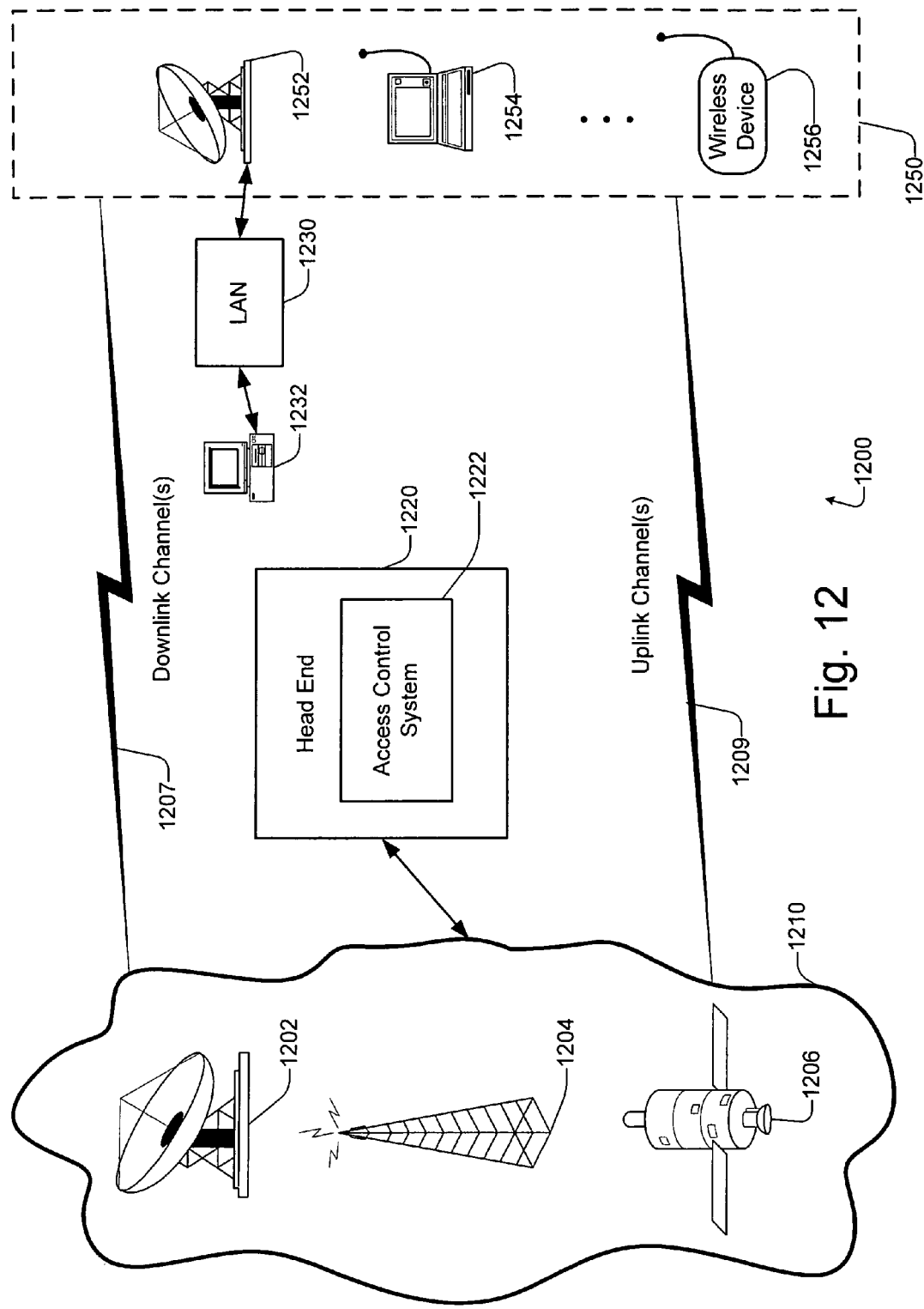
FIG. 12 shows an example of a wireless data communication system 1200 which may be used for implementing the technique of the present invention.

FIG. 12 shows an example of a wireless data communication system 1200 which may be used for implementing the technique of the present invention. As shown in FIG. 12, the wireless system includes a central termination system (or Head End) 1220. The Head End includes an access controller or access control system (ACS) 1222 which communicates with a plurality of wireless nodes 1250, and coordinates access between each of the wireless nodes and the Head End 1220. The access controller 1222 may include memory and at least one processor. In a specific embodiment, the function of the access controller 1222 is analogous to that of the CMTS described above with respect to cable modem networks. It may serve as a router or switch as well.

The Head End 1220 communicates with a plurality of wireless nodes 1250 via any one of a plurality of wireless transmitting and receiving devices 1210. As shown in FIG. 12, for example, the plurality of wireless transmitting and receiving devices 1210 may include satellite base stations 1202, orbital satellites 1206, radio towers 1204, etc.

In a specific embodiment which is analogous to that of cable modem networks, the Head End 1220 of the wireless computer system communicates with the plurality of nodes 1250 via one or more downlink channels 1207 and one or more uplink channels 1209. Each downlink channel 1207 is a broadcast-type channel utilized by the Head End to communicate with an associated group of wireless nodes within the wireless network. The uplink channel 1209 is a shared-access channel, which is utilized by a group of wireless nodes (analogous to cable modems) to communicate with the Head End 1220. The access controller 1222 stores registration parameters for the various nodes that it services. It may also store the IP addresses for nodes that it services.

In a specific embodiment of the present invention, the registration process and information is similar to that of the cable network CMTSs described above. Moreover, the techniques of the present invention relating to high availability functionality, load balancing functionality, and virtual cabling functionality over a shared access data network may be implemented in wireless system 1200.

The wireless devices or nodes 1250 may include any one of a number of wireless transmitting/receiving devices. For example, a satellite dish 1252 may be used to communicate with the Head End 1220 via the uplink and downlink channels. The satellite dish may, in turn, be connected to a local area network (LAN) 1230 which, may be further connected to one or more computer systems 1232. Another wireless device may be a portable/wireless computer system 1254, which is able to transmit and receive information to the Head End via uplink and downlink channels 1207 and 1209. Other wireless devices 1256 may include, for example, wireless telephones, handheld computing devices, etc.

In specific embodiments where the uplink and downlink channels within the wireless system 1200 are utilized in a manner similar to that of the upstream and downstream channels of a cable modem network, the above-described techniques may easily be implemented in wireless system 1200 using the detailed description of the present invention provided herein. Moreover, the technique of the present invention may be easily implemented in any computer network which uses shared access channels for communicating between a centralized computing system and one or more remote nodes.

It will be appreciated that the technique of the present invention is not limited to cable networks, and may be applied to any access data network which uses at least one shared access communication channel to communicate between a plurality of nodes in the network and a Head End of the network. Further, it will be appreciated that, the various techniques of the present invention as described herein may also be applied to downstream channels/ports in order to achieve features and/or benefits similar to those described above with respect upstream channels/ports.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A system, comprising:
at least one access control system including at least one cable modem termination system (CMTS) operable to communicate with a first plurality of nodes of a first subscriber group via a first shared access upstream channel, and operable to communicate with second plurality of nodes of a second subscriber group via a second shared access upstream channel, wherein the first and second plurality of nodes are cable modems;
the access control system comprising:
a CMTS line card including a first plurality of physical (PHY) layer components, the first plurality of physical layer components including a first upstream port and a first PHY processor, the first upstream port being associated with a first upstream channel, wherein the first plurality of nodes are physically coupled to the first upstream port;
wherein the CMTS line card further includes a second plurality of physical layer components, the second plurality of physical layer components including a second upstream port and a second PHY processor, the second upstream port being associated with a second upstream channel, wherein the second plurality of nodes are physically coupled to the second upstream port;
the access control system being operable to:
configure at least a portion of the first plurality of physical layer components to cause upstream signals from the first plurality of nodes coupled to the first upstream port to be processed by the first PHY processor;
configure at least a portion of the second plurality of physical layer components to cause upstream signals from the second plurality of nodes coupled to the second upstream port to be processed by the second PHY processor, wherein at least a portion of the second plurality of PHY layer components are coupled to at least a portion of the first plurality of PHY layer components via one or more physical components;
process upstream signals from a first portion of the first plurality of nodes at the first PHY processor;
process upstream signals from a second portion of the second plurality of nodes at the second PHY processor;
detect a first event or condition for triggering a dynamic re-configuration of at least one port-PHY processor configuration;
dynamically configure, in response to detecting the first event or condition, at least a portion of the first plurality of physical layer components to cause upstream signals received from the first portion of the first plurality of nodes via the first upstream port to be processed by the second PHY processor, thereby enabling the upstream signals sent from the first portion of the plurality of nodes coupled to the first upstream port associated with the first upstream channel to be processed by the second PHY processor associated with the second upstream channel; and
process, in response to the dynamic configuration, upstream signals from the first portion of the first plurality of nodes at the second PHY processor.

2. The system of claim 1:
wherein the first plurality of physical layer components includes a third upstream port, the third upstream port being associated with a third upstream channel;
the access control system being operable to:
configure at least a portion of the first plurality of physical layer components to cause upstream signals received from a third portion of the first plurality of nodes via the third upstream port to be processed by the first PHY processor;
process the upstream signals received from the third portion of the first plurality of nodes at the first PHY processor concurrently while the upstream signals received from the first portion of the first plurality of nodes are processed by the second PHY processor.

3. The system of claim 1:
wherein the first plurality of physical layer components includes a first splitter operable to communicatively couple the first upstream port to the first PHY processor and the second PHY processor; and
wherein the second plurality of physical layer components includes a second splitter operable to communicatively couple the first upstream port to the first PHY processor and the second PHY processor.

4. The system of claim 1 wherein the first event or condition relates to a bandwidth resource issue at the first upstream channel.

5. The system of claim 1 wherein the first event or condition relates to an upstream channel load balancing operation implemented at the access control system.

6. The system of claim 1 wherein the first event or condition relates to a failure detected in connection with the first upstream channel.

7. The system of claim 1, wherein the first plurality of physical layer components includes a third upstream port, the third upstream port being associated with a third upstream channel;
the access control system being operable to:
detect a bandwidth related issue at the first upstream channel;
identify, in response to detecting the bandwidth related issue, at least one alternate upstream channel to be used for performing load balancing on the first upstream channel and the at least one alternate upstream channel;
initiate, in response to detecting the bandwidth related issue, at least one load balancing operation for balancing bandwidth loads across selected upstream channels including the first and second upstream channels;

configure at least a portion of the first plurality of physical layer components to cause upstream signals received from a third portion of the first plurality of nodes via the third upstream port to be processed by the first PHY processor; and process upstream signals from the third portion of the first plurality of nodes at the first PHY processor concurrently while upstream signals from the first portion of the first plurality of nodes are processed by the second PHY processor.

8. The system of claim 1, wherein the first event or condition relates to an issue or problem associated with the first upstream channel, the access control system being further operable to:

identify a first selected portion of nodes registered to utilize the first upstream channel for communications with the access control system;

identify, in response to detecting the first event or condition, at least one alternate upstream channel to be used by the first selected portion of nodes for upstream communications with the access control system; and instruct the first selected portion of nodes to suspend upstream transmissions on first upstream channel.

9. The system of claim 1, wherein the first event or condition relates to an issue or problem associated with the first upstream channel, the access control system being further operable to:

identify a first selected portion of nodes registered to utilize the first upstream channel for communications with the access control system;

identify, in response to detecting the first event or condition, at least one alternate upstream channel to be used by the first selected portion of nodes for upstream communications with the access control system;

dynamically cause, in response to detecting the first event or condition, upstream transmissions on the first upstream channel to be temporarily suspended during a first time interval; and dynamically cause, in response to detecting the first event or condition, upstream transmissions on the at least one alternate upstream channel to be temporarily suspended during the first time interval.

10. The system of claim 1, wherein the first event or condition relates to an issue or problem associated with the first upstream channel, the access control system being further operable to:

identify a first selected portion of nodes registered to utilize the first upstream channel for communications with the access control system;

identify, in response to detecting the first event or condition, a first alternate upstream channel to be used by the first selected portion of nodes for upstream communications with the access control system, wherein the access control system is operable to receive, at a third upstream port, upstream communications transmitted on the first alternate upstream channel;

dynamically cause, in response to detecting the first event or condition, upstream transmissions on the first upstream channel to be temporarily suspended during a first time interval;

dynamically cause, in response to detecting the first event or condition, upstream transmissions on the at least one alternate upstream channel to be temporarily suspended during the first time interval;

dynamically configure, in response to detecting the first event or condition, the third upstream port to communicate with a selected PHY processor;

dynamically cause the first selected portion of nodes to utilize the first alternate upstream channel for communicating with the access control system; and dynamically cause, upstream transmissions on the first upstream channel and first alternate upstream channel to be resumed.

11. The system of claim 1 being further operable to:

identify duplicate upstream channel signals received at the first upstream port and second upstream port;

selectively identify a first portion of the duplicate upstream channel signals to processed by the access control system; and selectively identify a second portion of the duplicate upstream channel signals which are to be ignored.

12. The system of claim 1, wherein the one or more physical components include one or more switches.

13. The system of claim 1, wherein each upstream channel of the at least one CMTS is associated with a respective upstream port and a respective set of PHY layer components.

14. A system, comprising:

at least one access control system operable to communicate with a first plurality of nodes of a first subscriber group via a first shared access upstream channel, and operable to communicate with second plurality of nodes of a second subscriber group via a second shared access upstream channel;

the access control system comprising:

a cable modem termination system (CMTS) line card including a first plurality of physical (PHY) layer components, the first plurality of physical layer components including a first upstream port and a first PHY processor, the first upstream port being associated with a first upstream channel, wherein upstream signals from the first plurality of nodes are received via the first upstream port;

wherein the CMTS line card further includes a second plurality of physical layer components, the second plurality of physical layer components including a second upstream port and a second PHY processor, the second upstream port being associated with a second upstream channel, wherein upstream signals from the second plurality of nodes are received via the second upstream port, wherein at least a portion of the second plurality of PHY layer components are coupled to at least a portion of the first plurality of PHY layer components via one or more physical components;

the access control system being operable to:

configure upstream communications from the first plurality of nodes to be processed by the first PHY processor;

configure upstream communications from the second plurality of nodes to be processed by the second PHY processor;

process upstream signals from a first portion of the first plurality of nodes at the first PHY processor;

process upstream signals from a second portion of the second plurality of nodes at the second PHY processor;

detect a first event or condition for triggering a dynamic re-configuration of at least one node-PHY processor association;

dynamically configure, in response to detecting the first event or condition, upstream communications from the first plurality of nodes to be processed by the second PHY processor; and process, in response to the dynamic configuration, upstream signals from the first portion of the first plurality of nodes at the second PHY processor.

15. The system of claim 14:
wherein the first plurality of physical layer components includes a third upstream port, the third upstream port being associated with a third upstream channel;
the access control system being operable to:
process upstream signals from a third portion of the first plurality of nodes at the first PHY processor concurrently while upstream signals from the first portion of the first plurality of nodes are processed by the second PHY processor.

16. The system of claim 14 wherein the access control system operates in a cable network, wherein the access control system includes at least one cable modem termination system (CMTS), and wherein the first and second plurality of nodes are cable modems.

17. The system of claim 14:
wherein the first plurality of physical layer components includes a first splitter operable to communicatively couple the first upstream port to the first PHY processor and the second PHY processor; and
wherein the second plurality of physical layer components includes a second splitter operable to communicatively couple the first upstream port to the first PHY processor and the second PHY processor.

18. The system of claim 14 wherein the first event or condition relates to an upstream channel load balancing operation implemented at the access control system.

19. The system of claim 14, wherein the first plurality of physical layer components includes a third upstream port, the third upstream port being associated with a third upstream channel;
the access control system being operable to:
detect a bandwidth related issue at the first upstream channel;
identify, in response to detecting the bandwidth related issue, at least one alternate upstream channel to be used for performing load balancing on the first upstream channel and the at least one alternate upstream channel;
initiate, in response to detecting the bandwidth related issue, at least one load balancing operation for balancing bandwidth loads across selected upstream channels including the first and second upstream channels;
configure at least a portion of the first plurality of physical layer components to cause upstream signals received from a third portion of the first plurality of nodes via the third upstream port to be processed by the first PHY processor; and
process upstream signals from the third portion of the first plurality of nodes at the first PHY processor concurrently while upstream signals from the first portion of the first plurality of nodes are processed by the second PHY processor.

20. The system of claim 14, wherein the first event or condition relates to an issue or problem associated with the first upstream channel, the access control system being further operable to:
identify a first selected portion of nodes registered to utilize the first upstream channel for communications with the access control system;
identify, in response to detecting the first event or condition, a first alternate upstream channel to be used by the first selected portion of nodes for upstream communications with the access control system, wherein the access control system is operable to receive, at a third upstream port, upstream communications transmitted on the first alternate upstream channel;
dynamically cause, in response to detecting the first event or condition, upstream transmissions on the first upstream channel to be temporarily suspended during a first time interval;
dynamically cause, in response to detecting the first event or condition, upstream transmissions on the at least one alternate upstream channel to be temporarily suspended during the first time interval;
dynamically configure, in response to detecting the first event or condition, the third upstream port to communicate with a selected PHY processor;
dynamically cause the first selected portion of nodes to utilize the first alternate upstream channel for communicating with the access control system; and
dynamically cause, upstream transmissions on the first upstream channel and first alternate upstream channel to be resumed.

21. The system of claim 14, wherein the one or more physical components include one or more switches.

22. A method for facilitating communications in a cable network, the cable network including at least one cable modem termination system (CMTS) operable to communicate with a first plurality of cable modems of a first subscriber group via a first shared access upstream channel, and operable to communicate with second plurality of cable modems of a second subscriber group via a second shared access upstream channel, the at least one CMTS having a CMTS line card including a first plurality of physical (PHY) layer components, the first plurality of physical layer components including a first upstream port and a first PHY processor, wherein the first plurality of cable modems are physically coupled to the first upstream port, the first upstream port being associated with a first upstream channel, the CMTS line card of the at least one CMTS further including a second plurality of physical layer components, the second plurality of physical layer components including a second upstream port and a second PHY processor, wherein the second plurality of cable modems are physically coupled to the second upstream port, the second upstream port being associated with a second upstream channel, the method comprising:
configuring at least a portion of the first plurality of physical layer components to cause upstream signals received from the first plurality of nodes via the first upstream port to be processed by the first PHY processor;
configuring at least a portion of the second plurality of physical layer components to cause upstream signals received from the second plurality of nodes via the second upstream port to be processed by the second PHY processor, wherein at least a portion of the second plurality of PHY layer components are coupled to at least a portion of the first plurality of PHY layer components via one or more physical components;
processing upstream signals from a first portion of the first plurality of cable modems at the first PHY processor;
processing upstream signals from a second portion of the second plurality of cable modems at the second PHY processor;
detecting a first event or condition for triggering a dynamic re-configuration of at least one port-PHY processor configuration;
dynamically configuring, in response to detecting the first event or condition, at least a portion of the first plurality of physical layer components to cause upstream signals received from the first portion of the first plurality of nodes via the first upstream port to be processed by the second PHY processor, thereby enabling the upstream signals sent from the first portion of the plurality of nodes coupled to the first upstream port associated with the first upstream channel to be processed by the second PHY processor associated with the second upstream channel; and processing, in response to the dynamic configuration, upstream signals from the first portion of the first plurality of cable modems at the second PHY processor.

23. The method of claim 22, wherein the first plurality of physical layer components includes a third upstream port, the third upstream port being associated with a third upstream channel, the method further comprising:
configuring the third upstream port to communicate with the first PHY processor; and
processing upstream signals from a third portion of the first plurality of cable modems at the first PHY processor concurrently while upstream signals from the first portion of the first plurality of cable modems are processed by the second PHY processor.

24. The method of claim 22, wherein the first plurality of physical layer components includes a third upstream port, the third upstream port being associated with a third upstream channel, the method further comprising:
detecting a bandwidth related issue at the first upstream channel;
identifying, in response to detecting the bandwidth related issue, at least one alternate upstream channel to be used for performing load balancing on the first upstream channel and the at least one alternate upstream channel;
initiating, in response to detecting the bandwidth related issue, at least one load balancing operation for balancing bandwidth loads across selected upstream channels including the first and second upstream channels;
configuring the third upstream port to communicate with the first PHY processor; and
processing upstream signals from a third portion of the first plurality of cable modems at the first PHY processor concurrently while upstream signals from the first portion of the first plurality of cable modems are processed by the second PHY processor.

25. The method of claim 22, wherein the first event or condition relates to an issue or problem associated with the first upstream channel, the access control method further comprising:
identifying a first selected portion of cable modems registered to utilize the first upstream channel for communications with the access control method;
identifying, in response to detecting the first event or condition, a first alternate upstream channel to be used by the first selected portion of cable modems for upstream communications with the access control method, wherein the access control method is operable to receive, at a third upstream port, upstream communications transmitted on the first alternate upstream channel;
dynamically causing, in response to detecting the first event or condition, upstream transmissions on the first upstream channel to be temporarily suspended during a first time interval;
dynamically causing, in response to detecting the first event or condition, upstream transmissions on the at least one alternate upstream channel to be temporarily suspended during the first time interval;
dynamically configuring, in response to detecting the first event or condition, the third upstream port to communicate with a selected PHY processor;
dynamically causing the first selected portion of cable modems to utilize the first alternate upstream channel for communicating with the access control method; and
dynamically causing, upstream transmissions on the first upstream channel and first alternate upstream channel to be resumed.

26. The method of claim 22 further comprising:
identifying duplicate upstream channel signals received at the first upstream port and second upstream port;
identifying a first portion of the duplicate upstream channel signals to processed by the access control method; and
identifying a second portion of the duplicate upstream channel signals which are to be ignored.

27. The method of claim 22, wherein the one or more physical components include one or more switches.

28. The method as recited in claim 22, wherein each upstream channel of the at least one CMTS is associated with a respective upstream port and a respective set of PHY layer components.

29. A system for facilitating communications in a cable network, the system comprising:
at least one cable modem termination system (CMTS) operable to communicate with a first plurality of cable modems of a first subscriber group via a first shared access upstream channel, and operable to communicate with second plurality of cable modems of a second subscriber group via a second shared access upstream channel;
the at least one CMTS comprising at least one CMTS line card including a first plurality of physical (PHY) layer components, the first plurality of physical layer components including a first upstream port and a first PHY processor, the first upstream port being associated with a first upstream channel, wherein the first plurality of cable modems are physically coupled to the first upstream port;
the CMTS line card of the at least one CMTS further including a second plurality of physical layer components, the second plurality of physical layer components including a second upstream port and a second PHY processor, the second upstream port being associated with a second upstream channel, wherein the second plurality of cable modems are physically coupled to the second upstream port;
the first plurality of physical layer components further including a third upstream port, the third upstream port being associated with a third upstream channel;
means for configuring at least a portion of the first plurality of physical layer components to cause upstream signals from the first plurality of nodes coupled to the first upstream port to be processed by the first PHY processor;
means for configuring at least a portion of the second plurality of physical layer components to cause upstream signals from the second plurality of nodes coupled to the second upstream port to be processed by the second PHY processor, wherein at least a portion of the second plurality of PHY layer components are coupled to at least a portion of the first plurality of PHY layer components via one or more physical components;
means for processing upstream signals from a first portion of the first plurality of cable modems at the first PHY processor;
means for processing upstream signals from a second portion of the second plurality of cable modems at the second PHY processor;
means for detecting a first event or condition for triggering a dynamic re-configuration of at least one port-PHY processor configuration;

means for dynamically configuring, in response to detecting the first event or condition, at least a portion of the first plurality of physical layer components to cause upstream signals from the first portion of the first plurality of nodes to be processed by the second PHY processor, thereby enabling the upstream signals sent from the first portion of the plurality of nodes coupled to the first upstream port associated with the first upstream channel to be processed by the second PHY processor associated with the second upstream channel;

means for processing, in response to the dynamic configuration, upstream signals from the first portion of the first plurality of cable modems at the second PHY processor;

means for configuring at least a portion of the first plurality of physical layer components to cause upstream signals from a third portion of the first plurality of cable modems coupled to the third upstream port to be processed by the first PHY processor; and means for processing upstream signals from the third portion of the first plurality of cable modems at the first PHY processor concurrently while upstream signals from the first portion of the first plurality of cable modems are processed by the second PHY processor.

30. The system of claim 29, wherein the one or more physical components include one or more switches.

31. The system as recited in claim 29, wherein each upstream channel of the at least one CMTS is associated with a respective upstream port and a respective set of PHY layer components.

* * * * *